(12) United States Patent
Owoeye

(10) Patent No.: US 11,834,992 B2
(45) Date of Patent: Dec. 5, 2023

(54) HEAT EXCHANGER CAPACITY FOR ONE OR MORE HEAT EXCHANGERS ASSOCIATED WITH AN ACCESSORY GEARBOX OF A TURBOFAN ENGINE

(71) Applicant: General Electric Company, Schenectady, NY (US)

(72) Inventor: Eyitayo James Owoeye, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/730,610

(22) Filed: Apr. 27, 2022

(65) Prior Publication Data

US 2023/0349328 A1 Nov. 2, 2023

(51) Int. Cl.
*F02C 7/12* (2006.01)
*B64D 33/08* (2006.01)
(Continued)

(52) U.S. Cl.
CPC ............... *F02C 7/12* (2013.01); *B64D 33/08* (2013.01); *F02C 7/36* (2013.01); *F16H 57/02* (2013.01);
(Continued)

(58) Field of Classification Search
CPC ............................. F02C 7/12; F16H 57/0417
See application file for complete search history.

(56) References Cited

U.S. PATENT DOCUMENTS 2,999,630 A 9/1961 Warren et al.
3,341,114 A 9/1967 Larson
(Continued)

FOREIGN PATENT DOCUMENTS

CN 101657607 A 2/2010
EP 0385913 A1 9/1990
(Continued)

OTHER PUBLICATIONS

Crigler, Application of Theodorsen's Theory to Propeller Design, NACA (National Advisory Committee for Aeronautics) Report 924, 1948, pp. 83-99.
(Continued)

*Primary Examiner* — Courtney D Heinle
*Assistant Examiner* — John S Hunter, Jr.
(74) *Attorney, Agent, or Firm* — Dority & Manning, P.A.

(57) ABSTRACT

A turbofan engine having one or more heat exchangers tied to an accessory gearbox is provided. The accessory gearbox is mechanically coupled with a spool, and a hydraulic pump is mechanically coupled with the accessory gearbox. The one or more heat exchangers have a heat exchanger capacity defined by a product raised to a half power, the product being determined by multiplying a resultant heat transfer surface area density of the one or more heat exchangers by a heat conductance factor that relates an accessory gearbox heat load, a power of the hydraulic pump, a diameter of a fan, and a bypass ratio of the turbofan engine. The heat exchanger capacity is between 23.9 and 97.7 for a rotational speed of the spool between 7,500 and 35,000 revolutions per minute at one hundred percent capacity and a resultant heat transfer surface area density being between 4,000 $m^2/m^3$ and 13,000 $m^2/m^3$.

20 Claims, 9 Drawing Sheets

(51) Int. Cl.
*F16H 57/02* (2012.01)
*F16H 57/04* (2010.01)
*F02C 7/36* (2006.01)

(52) U.S. Cl.
CPC ..... *F16H 57/0417* (2013.01); *F05D 2220/36* (2013.01); *F05D 2260/20* (2013.01); *F16H 2057/02026* (2013.01); *F16H 2057/02043* (2013.01)

(56) References Cited

U.S. PATENT DOCUMENTS

| | | |
|---|---|---|
| 3,981,466 A | 9/1976 | Shah |
| 4,010,608 A | 3/1977 | Simmons |
| 4,043,121 A | 8/1977 | Thomas et al. |
| 4,486,146 A | 12/1984 | Campion |
| 4,542,623 A | 9/1985 | Hovan et al. |
| 4,569,199 A | 2/1986 | Klees et al. |
| 4,607,657 A | 8/1986 | Hirschkron |
| 4,784,575 A | 11/1988 | Nelson et al. |
| 4,860,537 A | 8/1989 | Taylor |
| 4,892,269 A | 1/1990 | Greco et al. |
| 4,907,946 A | 3/1990 | Ciokajlo et al. |
| 4,916,894 A | 4/1990 | Adamson et al. |
| 4,976,102 A | 12/1990 | Taylor |
| 5,054,998 A | 10/1991 | Davenport |
| 5,190,441 A | 3/1993 | Murphy et al. |
| 5,197,855 A | 3/1993 | Magliozzi et al. |
| 5,259,187 A | 11/1993 | Dunbar et al. |
| 5,345,760 A | 9/1994 | Giffin, III |
| 5,457,346 A | 10/1995 | Blumberg et al. |
| 5,544,700 A | 8/1996 | Shagoury |
| 5,950,308 A | 9/1999 | Koff et al. |
| 6,339,927 B1 | 1/2002 | DiPietro, Jr. |
| 6,547,518 B1 | 4/2003 | Czachor et al. |
| 6,763,654 B2 | 7/2004 | Orlando et al. |
| 6,792,758 B2 | 9/2004 | Dowman |
| 6,931,834 B2 | 8/2005 | Jones |
| 7,373,771 B2 | 5/2008 | Brouillet |
| 7,398,641 B2 | 7/2008 | Stretton et al. |
| 7,536,865 B2 | 5/2009 | Mikhail |
| 7,559,191 B2 | 7/2009 | Parks |
| 7,762,766 B2 | 7/2010 | Shteyman et al. |
| 8,276,392 B2 | 10/2012 | van der Woude |
| 8,382,430 B2 | 2/2013 | Parry et al. |
| 8,397,487 B2 | 3/2013 | Sennoun et al. |
| 8,459,035 B2 | 6/2013 | Smith et al. |
| 8,484,977 B2 | 7/2013 | Bader et al. |
| 8,689,538 B2 | 4/2014 | Sankrithi et al. |
| 8,762,766 B2 | 6/2014 | Ferguson et al. |
| 8,876,465 B2 | 11/2014 | Stretton |
| 8,943,796 B2 | 2/2015 | McCaffrey |
| 8,967,967 B2 | 3/2015 | Stretton et al. |
| 9,027,353 B2 | 5/2015 | Glahn et al. |
| 9,038,398 B2 | 5/2015 | Suciu et al. |
| 9,045,996 B2 | 6/2015 | Anghel et al. |
| 9,096,312 B2 | 8/2015 | Moxon |
| 9,097,134 B2 | 8/2015 | Ferch et al. |
| 9,239,005 B2 | 1/2016 | Strecker et al. |
| 9,534,538 B1 | 1/2017 | Cerny |
| 9,849,411 B2 * | 12/2017 | Sheridan ................. F16N 39/06 |
| 9,982,555 B2 | 5/2018 | Thet et al. |
| 9,995,314 B2 | 6/2018 | Miller et al. |
| 10,012,146 B2 | 7/2018 | Pelagatti et al. |
| 10,077,660 B2 | 9/2018 | Hoefer et al. |
| 10,090,676 B2 | 10/2018 | Knowles et al. |
| 10,126,062 B2 | 11/2018 | Cerny et al. |
| 10,184,400 B2 | 1/2019 | Cerny et al. |
| 10,202,865 B2 | 2/2019 | Breeze-Stringfellow et al. |
| 10,209,009 B2 | 2/2019 | Gerstler et al. |
| 10,253,648 B2 | 4/2019 | Bentley et al. |
| 10,260,419 B2 | 4/2019 | Cerny et al. |
| 10,263,550 B2 | 4/2019 | Thet et al. |
| 10,344,674 B2 | 7/2019 | Cerny et al. |
| 10,415,468 B2 | 9/2019 | Ackermann et al. |
| 10,415,475 B2 | 9/2019 | Brown et al. |
| 10,443,436 B2 | 10/2019 | Miller et al. |
| 10,487,739 B2 | 11/2019 | Miller et al. |
| 10,578,028 B2 | 3/2020 | Becker, Jr. |
| 10,644,630 B2 | 5/2020 | Smith et al. |
| 10,676,205 B2 | 6/2020 | Niergarth et al. |
| 10,739,077 B2 | 8/2020 | Gerstler et al. |
| 10,753,455 B2 | 8/2020 | van der Merwe et al. |
| 10,907,723 B2 | 2/2021 | Weaver et al. |
| 11,105,340 B2 | 8/2021 | Cheung et al. |
| 11,313,276 B2 | 4/2022 | Emmanouil et al. |
| 2004/0197187 A1 | 10/2004 | Usab et al. |
| 2004/0234372 A1 | 11/2004 | Shahpar |
| 2006/0005547 A1 | 1/2006 | Brouillet |
| 2009/0078819 A1 | 3/2009 | Guering et al. |
| 2010/0014977 A1 | 1/2010 | Shattuck |
| 2010/0111674 A1 | 5/2010 | Sparks |
| 2010/0251726 A1 | 10/2010 | Jones et al. |
| 2010/0329856 A1 | 12/2010 | Hofer et al. |
| 2011/0150659 A1 | 6/2011 | Micheli et al. |
| 2011/0192166 A1 | 8/2011 | Mulcaire |
| 2012/0177493 A1 | 7/2012 | Fabre |
| 2013/0104522 A1 | 5/2013 | Kupratis |
| 2014/0133982 A1 | 5/2014 | Dejeu et al. |
| 2014/0345253 A1 | 11/2014 | Dawson et al. |
| 2014/0345254 A1 | 11/2014 | Dawson et al. |
| 2015/0003993 A1 | 1/2015 | Kim et al. |
| 2015/0098813 A1 | 4/2015 | Jarrett, Jr. |
| 2015/0284070 A1 | 10/2015 | Breeze-Stringfellow et al. |
| 2015/0291276 A1 | 10/2015 | Zatorski et al. |
| 2015/0361891 A1 | 12/2015 | Schwarz et al. |
| 2016/0010487 A1 | 1/2016 | Breeze-Stringfellow et al. |
| 2016/0160647 A1 | 6/2016 | Hofer et al. |
| 2016/0160758 A1 | 6/2016 | Marchaj |
| 2016/0202003 A1 | 7/2016 | Gerstler et al. |
| 2016/0230658 A1 | 8/2016 | Hanlon et al. |
| 2017/0051678 A1 | 2/2017 | Becker, Jr. |
| 2017/0051680 A1 | 2/2017 | Becker, Jr. et al. |
| 2017/0102006 A1 | 4/2017 | Miller et al. |
| 2017/0114721 A1 | 4/2017 | Miller et al. |
| 2017/0167382 A1 | 6/2017 | Miller et al. |
| 2017/0184027 A1 | 6/2017 | Moniz et al. |
| 2017/0198719 A1 | 7/2017 | Cerny et al. |
| 2017/0283073 A1 | 10/2017 | Suciu et al. |
| 2018/0065727 A1 | 3/2018 | Gruber et al. |
| 2018/0066582 A1 | 3/2018 | Keeler |
| 2018/0118364 A1 | 5/2018 | Golshany et al. |
| 2018/0215475 A1 | 8/2018 | Hurt et al. |
| 2018/0283795 A1 | 10/2018 | Cerny et al. |
| 2019/0136710 A1 | 5/2019 | Breeze-Stringfellow et al. |
| 2019/0153952 A1 | 5/2019 | Niergarth et al. |
| 2019/0153953 A1 | 5/2019 | Niergarth et al. |
| 2019/0218971 A1 | 7/2019 | Niergarth et al. |
| 2019/0249599 A1 | 8/2019 | Sen et al. |
| 2019/0257247 A1 | 8/2019 | Pal et al. |
| 2019/0323433 A1 | 10/2019 | Bewick et al. |
| 2019/0360401 A1 | 11/2019 | Rambo et al. |
| 2020/0095939 A1 | 3/2020 | Epstein |
| 2020/0217249 A1 | 7/2020 | Djelassi |
| 2021/0025288 A1 | 1/2021 | Bordoni et al. |
| 2021/0079845 A1 | 3/2021 | Wilson |
| 2021/0108573 A1 | 4/2021 | Sibbach et al. |
| 2021/0148283 A1 | 5/2021 | Niergarth et al. |
| 2021/0156309 A1 | 5/2021 | Dreano et al. |

FOREIGN PATENT DOCUMENTS

| | | |
|---|---|---|
| EP | 0887259 A2 | 12/1998 |
| EP | 1493900 A2 | 1/2005 |
| EP | 2540989 A2 | 1/2013 |
| EP | 2562082 A2 | 2/2013 |
| EP | 3054126 A1 | 8/2016 |
| EP | 3093443 A1 | 11/2016 |
| GB | 2100799 A | 1/1983 |
| GB | 2196390 A | 4/1988 |
| GB | 2461811 A | 1/2010 |
| JP | H0370698 A | 3/1991 |
| JP | 2006123880 A | 5/2006 |
| JP | 2011527263 A | 10/2011 |

(56) References Cited

FOREIGN PATENT DOCUMENTS

| KR | 101179277 B1 | 9/2012 |
| WO | WO2004/033295 A1 | 4/2004 |
| WO | WO2005/111413 A1 | 11/2005 |
| WO | WO2011/020458 A2 | 2/2011 |
| WO | WO2011/094477 A2 | 8/2011 |
| WO | WO2011/107320 A1 | 9/2011 |
| WO | WO2014/143248 A1 | 9/2014 |

OTHER PUBLICATIONS

Naveen et al., CFD Analysis of Low Pressure Turbine Blade Using Vortex Generator Jets, Proceedings of $7^{th}$ International Conference on Intelligent Systems and Control (ISCO 2013) IEEE Explore, Coimbatore, Tamil Nadu, India, Jan. 4-5, 2013, pp. 541-544. https://ieeexplore.ieee.org/document/6481213.

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA//SAE/ASME/ASEE 28th Joint Propulsion Conference and Exhibit, Jul. 6-8, 1992, Nashville TN, pp. 1-9.

* cited by examiner (1) $HEC = (HTSAD_R * HCF)^{1/2}$ (2) $HTSAD_R = (HTSAD_{HXi} * HTSAD_{HXi+1} * HTSAD_{HXi+2} * ... HTSAD_{HXN})^{\frac{1}{N}}$ (2.1) $HTSAD_R = (HTSAD_{HX1} * HTSAD_{HX2} * HTSAD_{HX3} * HTSAD_{HX4})^{\frac{1}{4}}$ (2.2) $HTSAD_R = \sqrt[4]{(HTSAD_{HX1} * HTSAD_{HX2} * HTSAD_{HX3} * HTSAD_{HX4})}$ (3) $HTSAD = A_{HT} / V_{HT}$ (4) $HCF = (Q_{GB} / P_{H-PUMP}) * (D_{FAN} / BPR)$ (5) $Q_{GB} = T_{Max.\ Cont.} * (1 - \eta_{GB}) * V_{Cruise}$ (6) $P_{H-Pump} = \tau_{H-Pump} * n_{Speed\ Ratio} * 2\pi * N2$

FIG. 5

| ENGINE PARAMETERS | EXAMPLE 1 | EXAMPLE 2 | EXAMPLE 3 | EXAMPLE 4 |
|---|---|---|---|---|
| MAXIMUM CONTINUOUS THRUST (kN) | 35 | 100 | 250 | 400 |
| GEARBOX EFFICIENCY (-) | 99.80% | 99.70% | 99.60% | 99.50% |
| HP SPOOL SPEED (RPM) | 7500 | 12000 | 24000 | 35000 |
| MAX CRUISE SPEED (m/s) | 243.33 | 243.33 | 243.33 | 243.33 |
| HYDRAULIC PUMP CONTINUOUS TORQUE (Nm) | 50 | 110 | 146.9 | 196.17 |
| HYDRAULIC PUMP SPEED RATIO (-) | 0.7 | 0.5 | 0.3 | 0.17 |
| FAN DIAMETER (m) | 0.70 | 1.50 | 1.9 | 3.5 |
| BYPASS RATIO (-) | 3 | 10 | 15 | 20 |
| HTSAD_RESULTANT ($m^2/m^3$) | 4000 | 7000 | 10000 | 13000 |
| HEAT EXCHANGER CAPACITY (-) | 24.05 | 33.30 | 52.75 | 95.17 |

300

302

OPERATING A TURBOFAN ENGINE HAVING A LOW PRESSURE SPOOL, A FAN MECHANICALLY COUPLED WITH THE LOW PRESSURE SPOOL, A HIGH PRESSURE SPOOL, AN ACCESSORY GEARBOX MECHANICALLY COUPLED WITH THE HIGH PRESSURE SPOOL, A HYDRAULIC PUMP MECHANICALLY COUPLED WITH THE ACCESSORY GEARBOX, AND ONE OR MORE HEAT EXCHANGERS TIED TO THE ACCESSORY GEARBOX,

THE ONE OR MORE HEAT EXCHANGERS HAVING A HEAT EXCHANGER CAPACITY DEFINED BY A PRODUCT RAISED TO A HALF POWER, THE PRODUCT BEING DETERMINED BY MULTIPLYING A RESULTANT HEAT TRANSFER SURFACE AREA DENSITY ASSOCIATED WITH THE ONE OR MORE HEAT EXCHANGERS BY A HEAT CONDUCTANCE FACTOR THAT RELATES AN ACCESSORY GEARBOX HEAT LOAD ASSOCIATED WITH THE ACCESSORY GEARBOX, A HYDRAULIC PUMP POWER OF THE HYDRAULIC PUMP, A FAN DIAMETER OF THE FAN, AND A BYPASS RATIO OF THE TURBOFAN ENGINE, AND

WHEREIN THE HEAT EXCHANGER CAPACITY IS BETWEEN 23.9 AND 97.7 FOR A ROTATIONAL SPEED OF THE HIGH PRESSURE SPOOL BETWEEN 7,500 AND 35,000 REVOLUTIONS PER MINUTE AT ONE HUNDRED PERCENT CAPACITY AND A RESULTANT HEAT TRANSFER SURFACE AREA DENSITY BEING BETWEEN 4,000 $m^2/m^3$ AND 13,000 $m^2/m^3$

FIG. 14

HEATEXCHANGERCAPACITYFORONE OR MORE HEAT EXCHANGERS ASSOCIATED WITH AN ACCESSORY GEARBOX OF A TURBOFAN ENGINE

FIELD

The present disclosure relates to a turbofan engine having one or more heat exchangers associated with an accessory gearbox.

BACKGROUND

A turbofan engine can include an accessory gearbox mechanically coupled with a spool of the turbofan engine. The accessory gearbox can drive various engine accessories, such as a fuel pump, hydraulic pump, and one or more generators. The accessory gearbox can generate significant heat during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 5 lists various relationships between heat exchanger characteristics and operational and architectural characteristics of a turbofan engine in accordance with example embodiments of the present disclosure;

FIG. 14 provides a flow diagram for a method of operating a turbofan engine having one or more heat exchangers tied to an accessory gearbox in accordance with an example embodiment of the present disclosure.

DETAILED DESCRIPTION

Figure 1:
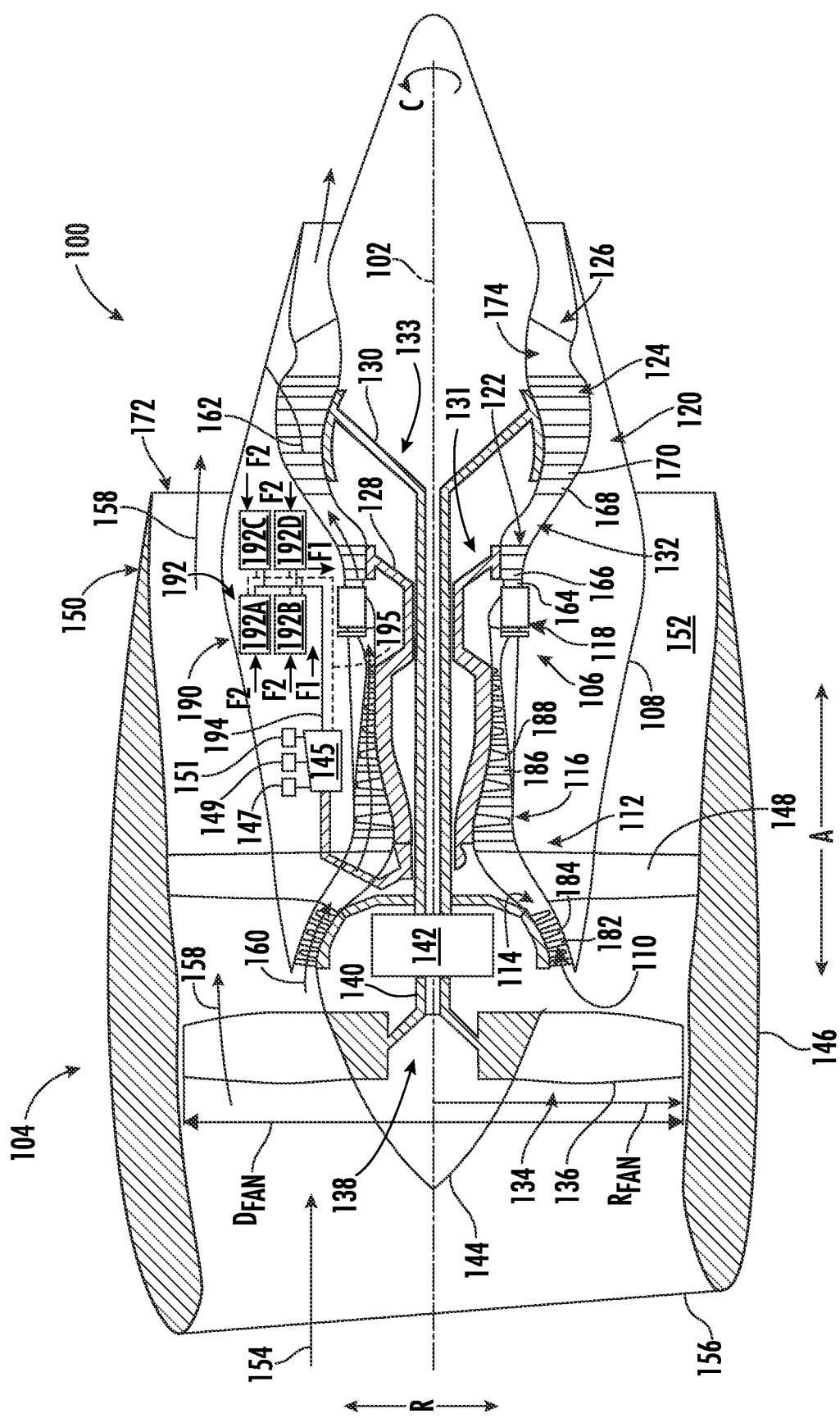
FIG. 1 provides a schematic cross-sectional view of a turbofan engine in accordance with an example embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, a heat exchanger is considered "tied" to an accessory gearbox where the heat exchanger is configured to process at least a portion of the heat load of the accessory gearbox.

A turbofan engine can include an accessory gearbox mechanically coupled with a spool of the turbofan engine, such as a high pressure spool. The accessory gearbox may act as a speed reducer between the high pressure spool and one or more engine accessories mechanically coupled with the accessory gearbox. Example engine accessories include, without limitation, a fuel pump, a hydraulic pump, and one or more generators. During operation, the accessory gearbox can generate significant heat. Accordingly, a turbofan engine can include one or more heat exchangers for processing the heat load generated by the accessory gearbox. Designing a gas turbine engine having one or more heat exchangers tied to an accessory gearbox can present certain challenges. For instance, there are certain challenges with designing a gas turbine engine having one or more heat exchangers that are both compact and able to effectively process heat duty of the accessory gearbox.

The inventor of the present disclosure has developed architectures for a turbofan engine having one or more heat exchangers tied to an accessory gearbox, wherein the one or more heat exchangers are both compact and able to effectively process heat duty. Particularly, the inventor proceeded in the manner of designing a turbofan engine with given fan, bypass ratio, accessory gearbox, and engine accessory characteristics, as well as characteristics of one or more heat exchangers tied to the accessory gearbox; checking the compactness and efficiency of the one or more heat exchangers given the characteristics of the fan, bypass ratio, accessory gearbox, and engine accessories as well as characteristics of the one or more heat exchangers; redesigning the turbofan engine, accessory gearbox, engine accessories, and/or the one or more heat exchangers by varying the fan diameter, speed ratio of the accessory gearbox, the power of the hydraulic pump, and bypass ratio as well as the area and/or volume of the channels of the one or more heat exchangers; rechecking the compactness and efficiency of the one or more heat exchangers given the characteristics of the fan, bypass ratio, accessory gearbox, and engine accessories as well as characteristics of the one or more heat exchangers; etc. during the design of several different types of gas turbine engines, including the turbofan engine described below with reference to FIG. 1.

During the course of this practice of studying/evaluating various fan architectures, speed ratios for the accessory gearbox, power ratings for the hydraulic pump, bypass ratios, and heat exchanger characteristics considered feasible for best satisfying mission requirements, a relationship was unexpectedly discovered between the compactness of the one or more heat exchangers and the ease of heat load distribution to the one or more heat exchangers tied to the accessory gearbox. This relationship is represented by a heat exchanger capacity. The heat exchanger capacity can be thought of as an indicator of the compactness and effectiveness of one or more heat exchangers tied to an accessory gearbox to process the heat duty of the accessory gearbox given the architectural arrangements of the turbofan engine and the accessory gearbox. The inventor has found that a turbofan engine having one or more heat exchangers that have a heat exchanger capacity within a range specified herein renders one or more heat exchangers that are optimally compact and effective at processing heat duty associated with the accessory gearbox.

Referring now to the drawings, FIG. 1 provides a schematic cross-sectional view of a turbofan engine 100 according to an example embodiment of the present disclosure. For the depicted embodiment of FIG. 1, the turbofan engine 100 is an aeronautical, high-bypass turbofan engine configured to be mounted to an aircraft, e.g., in an under-wing configuration. As shown, the turbofan engine 100 defines an axial direction A, a radial direction R, and a circumferential direction C. The axial direction A extends parallel to or coaxial with a longitudinal centerline 102 defined by the turbofan engine 100.

The turbofan engine 100 includes a fan section 104 and an engine core 106 disposed downstream of the fan section 104. The engine core 106 includes an engine cowl 108 that defines an annular core inlet 110. The engine cowl 108 encases, in a serial flow relationship, a compressor section 112 including a first, booster or LP compressor 114 and a second, HP compressor 116; a combustion section 118; a turbine section 120 including a first, HP turbine 122 and a second, LP turbine 124; and an exhaust section 126. The compressor section 112, combustion section 118, turbine section 120, and exhaust section 126 together define a core air flowpath 132 through the engine core 106.

An HP shaft 128 drivingly connects the HP turbine 122 to the HP compressor 116. An LP shaft 130 drivingly connects the LP turbine 124 to the LP compressor 114. The HP shaft 128, the rotating components of the HP compressor 116 that are mechanically coupled with the HP shaft 128, and the rotating components of the HP turbine 122 that are mechanically coupled with the HP shaft 128 collectively form a high pressure spool 131, or HP spool. The LP shaft 130, the rotating components of the LP compressor 114 that are mechanically coupled with the LP shaft 130, and the rotating components of the LP turbine 124 that are mechanically coupled with the LP shaft 130 collectively form a low pressure spool 133, or LP spool.

The fan section 104 includes a fan assembly 138 having a fan 134 mechanically coupled with a fan rotor 140. The fan 134 has a plurality of fan blades 136 circumferentially-spaced apart from one another. As depicted, the fan blades 136 extend outward from the fan rotor 140 generally along the radial direction R. A power gearbox 142 mechanically couples the LP spool 133 and the fan rotor 140. The power gearbox 142 may also be called a main gearbox. The power gearbox 142 includes a plurality of gears for stepping down the rotational speed of the LP shaft 130 to provide a more efficient rotational fan speed of the fan 134. In other example embodiments, the fan blades 136 of the fan 134 can be mechanically coupled with a suitable actuation member configured to pitch the fan blades 136 about respective pitch axes, e.g., in unison. In other example embodiments, the turbofan engine 100 can have a direct-drive configuration wherein the LP spool 133 directly drives the fan 134 without use of a power gearbox.

Referring still to FIG. 1, the fan rotor 140 and hubs of the fan blades 136 are covered by a rotatable spinner 144 aerodynamically contoured to promote an airflow through the plurality of fan blades 136. Additionally, the fan section 104 includes an annular fan casing or outer nacelle 146 that circumferentially surrounds the fan 134 and/or at least a portion of the engine core 106. The nacelle 146 is supported relative to the engine core 106 by a plurality of circumferentially-spaced outlet guide vanes 148. A downstream section 150 of the nacelle 146 extends over an outer portion of the engine core 106 so as to define a bypass passage 152 therebetween.

The turbofan engine 100 also includes an accessory gearbox 145. For this embodiment, the accessory gearbox 145 is mechanically coupled with the HP spool 131, or more particularly, with the HP shaft 128. In other embodiments, however, the accessory gearbox 145 can be mechanically coupled with the LP spool 133 or some other spool, such as an intermediate pressure spool in embodiments where the turbofan includes three (3) spools. The accessory gearbox 145 is mechanically coupled with various engine accessories, such as a fuel pump 147, a hydraulic pump 149, one or more generators 151 (only one shown in FIG. 1), one or more motors, etc. The accessory gearbox 145 can be mechanically coupled with the various engine accessories via one or more shafts, for example. Generally, the accessory gearbox 145 is configured to drive the engine accessories mechanically coupled thereto. The accessory gearbox 145 includes a plurality of gears for stepping down the rotational speed of the HP spool 131 to provide a more efficient rotational speed for the engine accessories.

During operation of the turbofan engine 100, a volume of air 154 enters the turbofan engine 100 through an associated inlet 156 of the nacelle 146 and/or fan section 104. As the volume of air 154 passes across the fan blades 136, a first portion of air 158 is directed or routed into the bypass passage 152 and a second portion of air 160 is directed or routed into the core inlet 110. The pressure of the second portion of air 160 is progressively increased as it flows downstream through the LP compressor 114 and HP compressor 116. Particularly, the LP compressor 114 includes sequential stages of LP compressor stator vanes 182 and LP compressor blades 184 that progressively compress the second portion of air 160. The LP compressor blades 184 are mechanically coupled to the LP shaft 130. Similarly, the HP compressor 116 includes sequential stages of HP compressor stator vanes 186 and HP compressor blades 188 that progressively compress the second portion of air 160 even further. The HP compressor blades 188 are mechanically coupled to the HP shaft 128. The compressed second portion of air 160 is then discharged from the compressor section 112 into the combustion section 118.

The compressed second portion of air 160 discharged from the compressor section 112 mixes with fuel and is burned within a combustor of the combustion section 118 to provide combustion gases 162. The combustion gases 162 are routed from the combustion section 118 along a hot gas path 174 of the core air flowpath 132 through the HP turbine 122 where a portion of thermal and/or kinetic energy from the combustion gases 162 is extracted via sequential stages of HP turbine stator vanes 164 and HP turbine blades 166. The HP turbine blades 166 are mechanically coupled to the HP shaft 128. Thus, when the HP turbine blades 166 extract energy from the combustion gases 162, the HP shaft 128 rotates, thereby supporting operation of the HP compressor 116. The combustion gases 162 are routed through the LP turbine 124 where a second portion of thermal and kinetic energy is extracted from the combustion gases 162 via sequential stages of LP turbine stator vanes 168 and LP turbine blades 170. The LP turbine blades 170 are coupled to the LP shaft 130. Thus, when the LP turbine blades 170 extract energy from the combustion gases 162, the LP shaft 130 rotates, thereby supporting operation of the LP compressor 114, as well as the fan 134 by way of the power gearbox 142.

The combustion gases 162 are subsequently routed through the exhaust section 126 of the engine core 106 to provide propulsive thrust. Simultaneously, the pressure of the first portion of air 158 is substantially increased as the first portion of air 158 is routed through the bypass passage 152 before it is exhausted from a fan nozzle exhaust section 172 of the turbofan engine 100, also providing propulsive thrust. The HP turbine 122, the LP turbine 124, and the exhaust section 126 at least partially define the hot gas path 174 for routing the combustion gases 162 through the engine core 106.

As further shown in FIG. 1, the turbofan engine 100 includes a cooling system 190 for cooling various components, such as the accessory gearbox 145. The cooling system 190 includes one or more heat exchangers 192. For this embodiment, the one or more heat exchangers 192 include four (4) heat exchangers, including a first heat exchanger 192A, a second heat exchanger 192B, a third heat exchanger 192C, and a fourth heat exchanger 192D. The heat exchangers 192 can each be any suitable type of heat exchanger, such as, without limitation, a fuel-to-oil heat exchanger, an air-to-oil heat exchanger, or an oil-to-oil heat exchanger. In this regard, the one or more heat exchangers 192 can include one or more of a fuel-to-oil heat exchanger, an air-to-oil heat exchanger, an oil-to-oil heat exchanger, some combination thereof, etc.

The one or more heat exchangers 192 are configured to receive one or more first fluids F1 from the accessory gearbox 145, e.g., via one or more fluid supply conduits 194 (only one shown in FIG. 1). The one or more first fluids F1 received from the accessory gearbox 145 can be, for example, oil, one or more other transmission fluids, one or more lubrication fluids, some combination thereof, etc. The one or more heat exchangers 192 are also configured to receive one or more second fluids F2 from other sources of the turbofan engine 100 or aircraft to which the turbofan engine 100 is mounted. For instance, the one or more second fluids F2 can include fuel received from a fuel tank, cooled oil received from a scavenge oil tank, air bled from the bypass passage 152 and/or the core air flowpath 132, etc. The one or more second fluids F2 can be used by the or more heat exchangers 192 to cool the one or more first fluids F1. The one or more first fluids F1 can be recirculated back to the accessory gearbox 145, e.g., via one or more fluid return conduits 195 (only one shown in FIG. 1).

It will be appreciated that the turbofan engine 100 depicted in FIG. 1 is provided by way of example only, and that in other example embodiments, the turbofan engine 100 may have any other suitable configuration. Additionally, or alternatively, aspects of the present disclosure may be utilized with any other suitable aeronautical turbofan engine, such as a turboshaft engine, turboprop engine, turbojet engine, etc.

Figure 2:
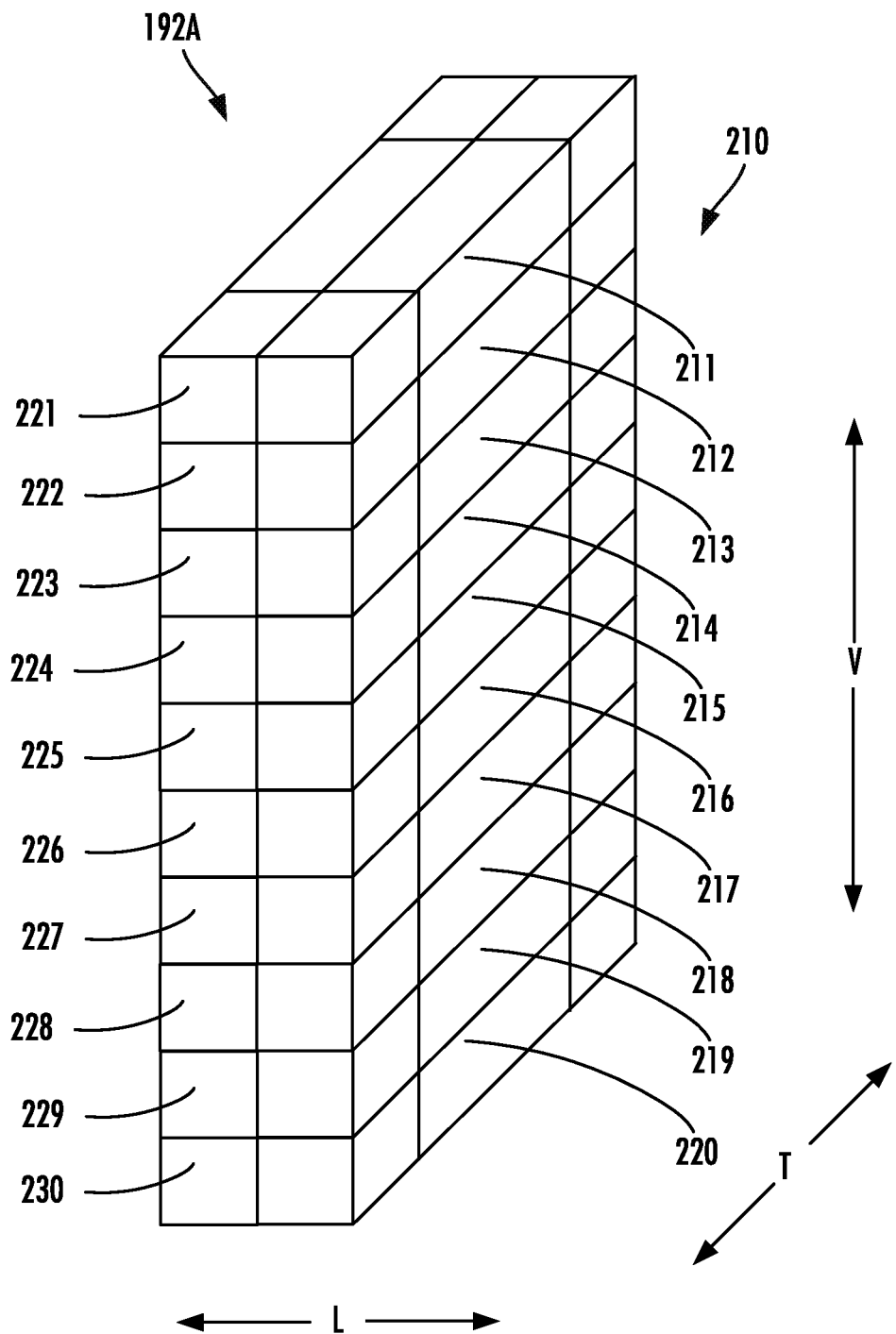
FIG. 2 provides a perspective view of a heat exchanger of the turbofan engine of FIG. 1.

FIG. 2 provides a perspective view of one of the one or more heat exchangers of the turbofan engine 100 of FIG. 1. Particularly, the first heat exchanger 192A is depicted. The second heat exchanger 192B, the third heat exchanger 192C, and the fourth heat exchanger 192D of FIG. 1 may be configured in a same or similar manner as the first heat exchanger 192A. For instance, the heat exchangers 192B, 192C, 192D may each include a plurality of exchanger units each having a core defining first and second channels, as provided below.

As depicted in FIG. 2, the first heat exchanger 192A defines a vertical direction V, a lateral direction L, and a transverse direction T that are orthogonal to one another. The first heat exchanger 192A includes a plurality of exchanger units 210. The exchanger units 210 can be compactly arranged in any suitable configuration. For this embodiment, the first heat exchanger 192A includes twenty (20) exchanger units 210, including ten right-side exchanger units 211-220 stacked on top of one another along the vertical direction V and ten left-side exchanger units 221-230 stacked on top of one another along the vertical direction V. Although the first heat exchanger 192A of FIG. 2 has twenty exchanger units 210, in other example embodiments, the first heat exchanger 192A can include any suitable number of exchanger units, such as one exchanger unit, eight exchanger units, fifty exchanger units, etc. Further, in other embodiments, the exchanger units 210 can be positioned side-by-side rather than stacked on one another.

Figure 4:
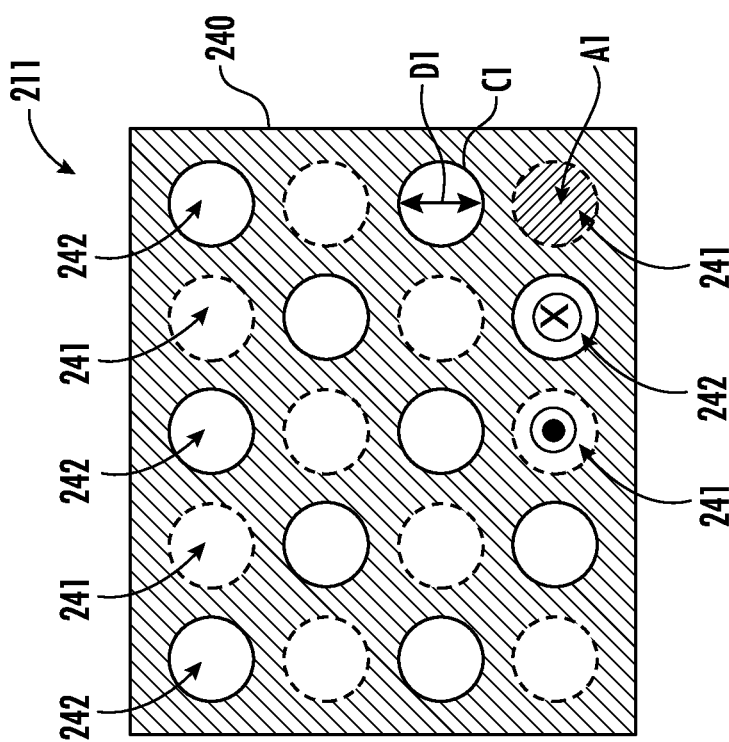
FIG. 4 provides a cross-sectional view of a core of the exchanger unit taken along line 4-4 of FIG. 3.
Figure 3:
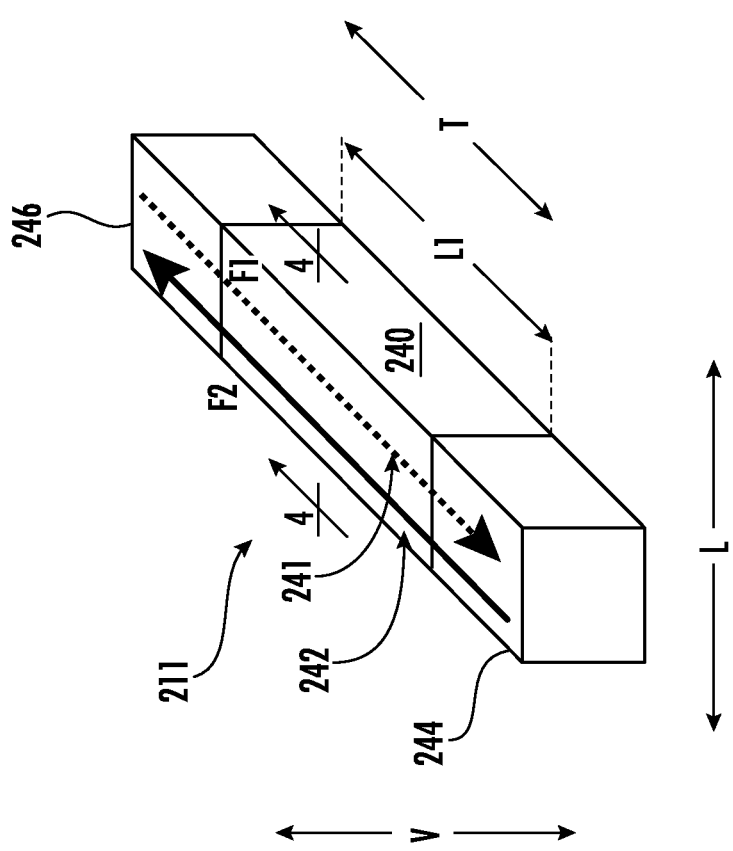
FIG. 3 provides a perspective view of an exchanger unit of the heat exchanger of FIG. 2.

With reference now to FIGS. 2, 3, 4, FIG. 3 provides a perspective view of a first exchanger unit 211 of the first heat exchanger 192A of FIG. 2. FIG. 4 provides a cross-sectional view of a core of the first exchanger unit 211 taken along line 4-4 of FIG. 3. Generally, each exchanger unit 210 of the first heat exchanger 192A has a core and two manifolds. The core of each exchanger unit defines first channels and second channels. The first channels can receive a first fluid and the second channels can receive a second fluid. The core of one or more of the exchanger units 210 can be formed by a plurality of unit cells arranged in flow communication with one another. Alternatively, the core of one or more of the exchanger units 210 can be formed as monolithic blocks.

By way of example, as depicted, the first exchanger unit 211 includes a core 240 defining first channels 241 (outlined by dashed lines in FIG. 4) and second channels 242 (outlined by solid lines in FIG. 4). The first channels 241 can receive a first fluid F1 and the second channels 242 can receive a second fluid F2. The first fluid F1 and the second fluid F2 can both be any suitable fluid. The first fluid F1 flowing through the first channels 241 can be warmer than the second fluid F2 flowing through the second channels 242. In this way, thermal energy can be exchanged between the first and second fluids F1, F2 as they flow through the first exchanger unit 211. For this embodiment, the first fluid F1 flowing through the first channels 241 (out of the page as represented by the "circled dot" in FIG. 4) is in crossflow direction with respect to the second fluid F2 flowing through the second channels 242 (into the page as represented by the "circled X" in FIG. 4).

Although the core 240 of the first exchanger unit 211 is shown in a straight channel configuration in FIG. 3, the core 240 of the first exchanger unit 211 (as well as the cores of the other exchanger units 210) can have other suitable configurations, such as a double U-bend channel configuration, a single U-bend configuration, etc.

The first exchanger unit 211 includes a first manifold 244 and a second manifold 246. Generally, the first manifold 244 distributes the second fluid F2 to the second channels 242 and receives the first fluid F1 from the first channels 241. The first manifold 244 can be arranged to keep the first fluid F1 and the second fluid F2 fluidly separate. Similarly, the second manifold 246 distributes the first fluid F1 to the first channels 241 and receives the second fluid F2 from the second channels 242. The second manifold 246 can be arranged to keep the first fluid F1 and the second fluid F2 fluidly separate. The first manifold 244 and/or second manifold 246 can be in flow communication with a manifold of an adjacent exchanger unit such that the first and/or second fluids F1, F2 can flow between exchanger units 210 of the first heat exchanger 192A.

Each exchanger unit 210 of the first heat exchanger 192A can be configured in a same or similar manner as the first exchanger unit 211 provided above. In this way, each exchanger unit 210 of the first heat exchanger 192A can have a core arranged in a same or similar manner as the core 240 of the first exchanger unit 211 and two manifolds arranged in a same or similar manner as the first and second manifolds 244, 246 of the first exchanger unit 211. The core of each exchanger unit 210 defines first channels and second channels just as the core 240 defines the defines the first channels 241 and the second channels 242.

As alluded to earlier, the inventor discovered, unexpectedly during the course of engine design, that a relationship exists between the compactness of the one or more heat exchangers tied to an accessory gearbox of a turbofan engine and the ease of heat load distribution to the one or more heat exchangers tied to the accessory gearbox. This relationship is represented by a heat exchanger capacity. The inventor found that one or more heat exchangers having a heat exchanger capacity within one of the ranges specified herein provides one or more heat exchangers that are both optimally compact and effective at processing the heat duty associated with an accessory gearbox of a turbofan engine.

The heat exchanger capacity is a dimensionless quantity that relates a heat transfer surface area density associated with the one or more heat exchangers and a heat conductance factor that relates certain operational and architectural characteristics of the accessory gearbox, a hydraulic pump mechanically coupled with the accessory gearbox, and the turbofan engine. Particularly, the heat exchanger capacity captures the relationship between a resultant heat transfer surface density of the one or more heat exchangers tied to the accessory gearbox and a heat conductance factor that relates the accessory gearbox heat load or heat generation, hydraulic pump power, fan diameter, and bypass ratio of the turbofan engine. Consequently, the heat exchanger capacity is a function of a resultant heat transfer surface density of the one or more heat exchangers tied to the accessory gearbox of the turbofan engine and a heat conductance factor.

The resultant heat transfer surface density of the one or more heat exchangers measures the resultant compactness of the one or more heat exchangers. The resultant heat transfer surface area density for a selected architecture is determined by taking a product to an Nth root, wherein the product is determined by multiplying together a heat transfer surface area density associated with each of the one or more heat exchangers tied to the accessory gearbox, wherein N is a number of heat exchangers tied to the accessory gearbox. The heat transfer surface area density for a given heat exchanger is a function of the heat transfer surface area and volume of the channels of the given heat exchanger. In this regard, the heat transfer surface area density for a given heat exchanger is based on the architecture of the given heat exchanger.

The heat conductance factor, as noted above, relates the accessory gearbox heat load associated with the accessory gearbox, the hydraulic pump power of the hydraulic pump, the fan diameter, and the bypass ratio of the turbofan engine.

In this regard, the heat conductance factor is based on the architecture of the accessory gearbox as well as the turbofan engine. Generally, the greater the accessory gearbox heat load and/or the larger the fan diameter, the greater the heat conductance factor. The greater the bypass ratio and/or hydraulic pump power, the smaller the heat conductance factor. Greater heat transfer surface area density and/or heat conductance factor leads to increased heat exchanger capacity, which results in higher potential to process more heat duty associated with the accessory gearbox.

The ranges of heat exchanger capacities for one or more heat exchangers tied to an accessory gearbox provided herein capture specific subsets of structures for one or more heat exchangers, accessory gearboxes, and turbofan engines that take into consideration various benefits and penalties of choosing one structural architecture of one or more heat exchangers and/or turbofan engine over another. In this regard, as discovered by the inventor, the ranges of heat exchanger capacities provided herein strike a balance between the compactness and weight of one or more heat exchangers tied to an accessory gearbox, the ability of the one or more heat exchangers to process the heat duty of the accessory gearbox, the susceptibility of the channels of the one or more heat exchangers to becoming blocked or contaminated, the manufacturability of the one or more heat exchangers, the manufacturability of the accessory gearbox, gearbox efficiency, speed ratio, and torque output, the power of the hydraulic pump mechanically coupled with the accessory gearbox, the manufacturability of the turbofan engine, and the thrust and speed outputs of the turbofan engine.

In addition to discovering the heat exchanger capacity, the inventor has discovered a relationship between the heat exchanger capacity of one or more heat exchangers tied to an accessory gearbox of a turbofan engine and a rotational speed of the high pressure spool at one hundred percent capacity (100%), wherein the high pressure spool is mechanically coupled with the accessory gearbox. The inventor observed that, as a maximum rotational speed of the high pressure spool of a given turbofan increases, the heat exchanger capacity exponentially decreases. This discovered relationship can be used advantageously to design turbofan engines and their associated accessory gearbox and heat exchanger(s), since the relationship accounts for operational characteristics of the engine influencing the heat exchanger capacity.

Further, utilizing the heat exchanger capacity, the inventor found that the number of suitable or feasible engine and/or heat exchanger designs that allow the heat exchanger to meet compactness, weight, and heat duty requirements could be greatly diminished, thereby facilitating a more rapid down selection of designs to consider as a turbofan engine having one or more heat exchangers tied to an accessory gearbox is developed. Such a benefit provides more insight into the requirements for a given turbofan engine well before specific technologies, integration and system requirements are developed fully. It may also prevent late-stage redesign. For instance, selection of a heat exchanger's heat transfer surface area density may be facilitated by utilizing a heat exchanger capacity within the ranges provided herein, which may help determine the needed channel diameters and wall thickness of the core of the heat exchanger. Moreover, utilizing a heat exchanger capacity within the ranges provided herein may eliminate or otherwise reduce implementation of heat exchangers having heat transfer surface area density values that are too high, making them not practical to manufacture. Higher heat transfer surface area density values may create higher susceptibility to blocking/contamination of the exchanger channels, which may limit the heat exchanger's effectiveness. Also, utilizing a heat exchanger capacity within the ranges provided herein may facilitate exclusion or reduction of heat exchangers that are bulky.

With reference now to FIGS. 1, 2, 3, 4, and 5, FIG. 5 lists various relationships between heat exchanger characteristics and operational and architectural characteristics of a turbofan engine to be described below. Notably, the turbofan engine 100 and the one or more heat exchangers 192 are arranged so that the one or more heat exchangers 192 are tied to the accessory gearbox 145 have a heat exchanger capacity HEC. Generally, the heat exchanger capacity HEC measures the heat load capacity on the heat exchangers 192 tied to the accessory gearbox 145 of the turbofan engine 100. The heat exchangers 192 are tied to the accessory gearbox 145 in that the one or more heat exchangers 192 are configured to process at least a portion of a heat load of the accessory gearbox 145. The heat exchanger capacity HEC is a dimensionless quantity that relates a resultant heat transfer surface area density $HTSAD_R$ associated with the one or more heat exchangers 192 tied to the accessory gearbox 145 and a heat conductance factor HCF.

As will be explained more fully below, the resultant heat transfer surface area density $HTSAD_R$ is a function of the structural architecture of the one or more heat exchangers 192 tied to the accessory gearbox 145. The heat conductance factor HCF is a function of certain aspects of the one or more heat exchangers 192 and the turbofan engine 100. Specifically, the heat conductance factor HCF relates an accessory gearbox heat load $Q_{GB}$ associated with the one or more heat exchangers 192, a hydraulic pump power $P_{H\text{-}Pump}$ of the hydraulic pump 149 at one hundred percent capacity (100%), a fan diameter $D_{FAN}$ of the fan 134, and a bypass ratio BPR of the turbofan engine 100.

The heat exchanger capacity HEC is defined as a product raised to a half power, the product being determined by multiplying the resultant heat transfer surface area density $HTSAD_R$ associated with the one or more heat exchangers 192 by the heat conductance factor HCF. Stated differently, the heat exchanger capacity HEC is the product of the resultant heat transfer surface area density $HTSAD_R$ and the heat conductance factor HCF, the product being raised to the half power (1/2). The heat exchanger capacity HEC is defined by the inventor as follows:

$$HEC = (HTSAD_R * HCF)^{1/2} \qquad (1)$$

The resultant heat transfer surface area density $HTSAD_R$ of (1) provides a measure of the resultant compactness of the one or more heat exchangers 192 tied to the accessory gearbox 145. The unit of measure for the resultant heat transfer surface area density $HTSAD_R$ is meters squared per meters cubed (m²/m³). The resultant heat transfer surface area density $HTSAD_R$ is determined by taking a product to an Nth root, wherein the product is determined by multiplying together a heat transfer surface area density associated with each of the one or more heat exchangers 192 tied to the accessory gearbox 145, and N is a number of heat exchangers tied to the accessory gearbox 145. The resultant heat transfer surface area density $HTSAD_R$ is defined by the inventor according to (2), wherein i is an index starting at 1, N is the number of heat exchangers tied to the accessory gearbox 145, and HTSAD is the heat transfer surface area density associated with a given heat exchanger HX:

$$HTSAD_R = \qquad (2)$$

$$(HTSAD_{HXi} * HTSAD_{HXi+1} * HTSAD_{HXi+2} * \ldots HTSAD_{HXN})^{\frac{1}{N}}$$

By way of example, for the depicted embodiment of FIG. 1, there are four (4) heat exchangers 192 tied to the accessory gearbox 145. Thus, the number of heat exchangers N is four (4). Consequently, the product determined by multiplying together the heat transfer surface area densities HTSAD associated with the heat exchangers 192 is thus raised to a quarter power (1/4), or taken to a fourth root. For the embodiment of FIG. 1, (2) can be rewritten as (2.1) set forth below:

$$HTSAD_R = (HTSAD_{HX1} * HTSAD_{HX2} * HTSAD_{HX3} * HTSAD_{HX4})^{\frac{1}{4}} \qquad (2.1)$$

wherein the first heat exchanger 192A corresponds with HX1, the second heat exchanger 192B corresponds with HX2, the third heat exchanger 192C corresponds with HX3, and the fourth heat exchanger 192D corresponds with HX4. Alternatively, for the depicted embodiment of FIG. 1, (2) can be rewritten in root form in accordance with (2.2) set forth below:

$$HTSAD_R = \sqrt[4]{(HTSAD_{HX1} * HTSAD_{HX2} * HTSAD_{HX3} * HTSAD_{HX4})} \qquad (2.2)$$

The heat transfer surface area density HTSAD for a given heat exchanger provides a measure of the compactness of the given heat exchanger. The heat transfer surface area density HTSAD for a given heat exchanger is defined as a quotient determined by dividing a heat exchanger channel surface area $A_{HT}$ associated with a plurality of channels of the given heat exchanger by a heat exchanger channel volume $V_{HT}$ associated with the plurality of channels of the given heat exchanger. Stated differently, the heat exchanger channel surface area $A_{HT}$ divided by the heat exchanger channel volume $V_{HT}$ is equal to the heat transfer surface area density HTSAD for a given heat exchanger.

The heat exchanger channel surface area $A_{HT}$ for a given heat exchanger is defined by a surface area of the channels of the given heat exchanger. The heat exchanger channel volume $V_{HT}$ for the given heat exchanger is defined by a volume of the channels of the given heat exchanger. In this regard, the heat transfer surface area density HTSAD for a given heat exchanger relates the surface area of the channels with the volume of the channels. The unit of measure for the heat transfer surface area density HTSAD for a given heat exchanger is meters squared per meters cubed (m²/m³). The heat transfer surface area density HTSAD for a given heat exchanger is defined by the inventor as follows:

$$HTSAD = A_{HT}/V_{HT} \qquad (3)$$

The heat exchanger channel surface area $A_{HT}$ for a given heat exchanger may be determined as follows. First, the surface area associated with each channel of each core of the heat exchanger is determined. Second, once the surface area associated with each channel of the given heat exchanger is determined, the surface area for each channel is summed to determine the heat exchanger channel surface area $A_{HT}$. In this regard, the heat exchanger channel surface area $A_{HT}$ describes the total surface area associated with the channels of the core of each exchanger unit of the heat exchanger.

By way of example, the heat exchanger channel surface area $A_{HT}$ for the first heat exchanger 192A, or HX1 from (2.1) and (2.2), may be determined as follows. First, the surface area associated with each channel 241, 242 of each core 240 of the first heat exchanger 192A is determined. The surface area for a given one of the channels 241, 242 may be defined as a circumference C1 (see FIG. 4 depicting a circumference of one of the second channels 242) of the given channel multiplied by a length L1 (FIG. 3) of the given channel. As will be appreciated, the circumference C1 of the given channel may be defined as the diameter D1 (see FIG. 4 depicting a diameter of one of the second channels 242) of the given channel multiplied by Pi ($\pi$). Second, once the surface area associated with each channel 241, 242 of the core 240 of each exchanger unit 210 of the first heat exchanger 192A is determined, the surface area for each channel 241, 242 is summed to determine the heat exchanger channel surface area $A_{HT}$. In this regard, the heat exchanger channel surface area $A_{HT}$ describes the total surface area associated with the channels 241, 242 of the core 240 of each exchanger unit 210 of the first heat exchanger 192A. The heat exchanger channel surface area $A_{HT}$ for the other heat exchangers 192B, 192C, 192D can be determined in a same manner as described above.

The heat exchanger channel volume $V_{HT}$ for a given heat exchanger may be determined as follows. First, the volume associated with each channel of each core of the heat exchanger is determined. Second, once the volume associated with each channel of the heat exchanger is determined, the volume for each channel is summed to determine the heat exchanger channel volume $V_{HT}$. In this regard, the heat exchanger channel volume $V_{HT}$ describes the total volume associated with the channels of the core of each exchanger unit of the heat exchanger.

By way of example, the heat exchanger channel volume $V_{HT}$ for the first heat exchanger 192A, or HX1 from (2.1) and (2.2), may be determined as follows. First, the volume associated with each channel 241, 242 of each core 240 of the first heat exchanger 192A is determined. The volume for a given one of the channels 241, 242 may be defined as an area A1 of the given channel (represented in FIG. 4 by the cross hatching in one of the first channels 241) multiplied by the length L1 of the given channel. As will be appreciated, the area A1 of the given channel may be defined as the diameter D1 squared multiplied by Pi ($\pi$) multiplied by one quarter, or stated differently, the radius of the given channel squared multiplied by Pi ($\pi$). Second, once the volume associated with each channel 241, 242 of the core 240 of each exchanger unit 210 of the first heat exchanger 192A is determined, the volume for each channel 241, 242 is summed to determine the heat exchanger channel volume $V_{HT}$. In this regard, the heat exchanger channel volume $V_{HT}$ describes the total volume associated with the channels 241, 242 of the core 240 of each exchanger unit 210 of the first heat exchanger 192A. The heat exchanger channel volume $V_{HT}$ for the other heat exchangers 192B, 192C, 192D can be determined in a same manner as described above.

The heat transfer surface area density HTSAD associated with the first heat exchanger 192A, or $HTSAD_{HX1}$ of (2.1) and (2.2), may thus be determined as the quotient determined by dividing the heat exchanger channel surface area $A_{HT}$ associated with the plurality of channels 241, 242 of the first heat exchanger 192A to the heat exchanger channel volume $V_{HT}$ associated with the plurality of channels 241, 242 of the first heat exchanger 192A. Likewise, the heat transfer surface area density HTSAD associated with the second heat exchanger 192B, or $HTSAD_{HX2}$ of (2.1) and (2.2), may thus be determined as the quotient determined by dividing the heat exchanger channel surface area $A_{HT}$ associated with the plurality of channels of the second heat exchanger 192B to the heat exchanger channel volume $V_{HT}$ associated with the plurality of channels of the second heat exchanger 192B. Further, the heat transfer surface area density HTSAD associated with the third heat exchanger 192C, or $HTSAD_{HX3}$ of (2.1) and (2.2), may therefore be determined as the quotient determined by dividing the heat exchanger channel surface area $A_{HT}$ associated with the plurality of channels of the third heat exchanger 192C to the heat exchanger channel volume $V_{HT}$ associated with the plurality of channels of the third heat exchanger 192C. Moreover, the heat transfer surface area density HTSAD associated with the fourth heat exchanger 192D, or $HTSAD_{HX4}$ of (2.1) and (2.2), may thus be determined as the quotient determined by dividing the heat exchanger channel surface area $A_{HT}$ associated with the plurality of channels of the fourth heat exchanger 192D to the heat exchanger channel volume $V_{HT}$ associated with the plurality of channels of the fourth heat exchanger 192D.

The heat conductance factor HCF of (1) describes the degree of difficulty in transferring thermal energy from the accessory gearbox 145 to the one or more heat exchangers 192 based on the accessory gearbox heat load $Q_{GB}$, the hydraulic pump power $P_{H-Pump}$, the fan diameter $D_{FAN}$, and the bypass ratio BPR. Stated differently, the heat conductance factor HCF represents the ease of heat load distribution to the one or more heat exchangers 192 tied to the accessory gearbox 145. Larger fan diameters and lower bypass ratios may provide more airflow supply, implying higher potential for heat transfer. Higher accessory gearbox heat loads and lower hydraulic pumping power implies higher heat load availability to be processed by the one or more heat exchangers 192.

The heat conductance factor HCF is defined by the inventor as a product determined by multiplying a first quotient by a second quotient. The first quotient is determined by dividing the accessory gearbox heat load $Q_{GB}$ by the hydraulic pump power $P_{H-Pump}$ of the hydraulic pump 149 at one hundred percent capacity (100%). The second quotient is determined by dividing the fan diameter $D_{FAN}$ of the fan 134 by the bypass ratio BPR of the turbofan engine 100. In this regard, the heat conductance factor HCF relates the accessory gearbox heat load $Q_{GB}$ associated with the one or more heat exchangers 192, the hydraulic pump power $P_{H-Pump}$ of the hydraulic pump 149 at one hundred percent capacity (100%), the fan diameter $D_{FAN}$ of the fan 134, and the bypass ratio BPR of the turbofan engine 100. The unit of measure for the heat conductance factor HCF is meters (m). The heat conductance factor HCF is defined by the inventor as follows:

$$HCF = (Q_{GB}/P_{H-Pump}) * (D_{FAN}/BPR) \quad (4)$$

The accessory gearbox heat load $Q_{GB}$ associated with the first quotient of (4) is defined as a product determined by multiplying a maximum continuous thrust $T_{Max.\ Cont.}$ associated with the turbofan engine 100 by one (1) minus an accessory gearbox efficiency 17 GB and by a maximum continuous cruise speed $V_{Cruise}$ associated with the turbofan engine 100. The maximum continuous thrust $T_{Max.\ Cont.}$ is a maximum continuous thrust that can be produced by the turbofan engine 100, or rather, a maximum thrust the turbofan engine 100 can produce continuously. The maximum continuous cruise speed $V_{Cruise}$ is a maximum continuous speed at which the turbofan engine 100 can operate during cruise flight, or rather, a maximum speed at which the turbofan engine 100 can achieve continuously during cruise flight. As used herein, cruise flight refers to a phase of flight in which an aircraft levels in altitude after a climb phase and prior to descending to an approach phase. In various examples, cruise flight may take place at a cruise altitude up to approximately 65,000 ft. In certain examples, cruise altitude is between approximately 28,000 ft. and approximately 45,000 ft. In yet other examples, cruise altitude is expressed in flight levels (FL) based on a standard air pressure at sea level, in which cruise flight is between FL280 and FL650. In another example, cruise flight is between FL280 and FL450. In still certain examples, cruise altitude is defined based at least on a barometric pressure, in which cruise altitude is between approximately 4.85 psia and approximately 0.82 psia based on a sea-level pressure of approximately 14.70 psia and sea-level temperature at approximately 59 degrees Fahrenheit. In another example, cruise altitude is between approximately 4.85 psia and approximately 2.14 psia. It should be appreciated that, in certain examples, the ranges of cruise altitude defined by pressure may be adjusted based on a different reference sea-level pressure and/or sea-level temperature.

As the accessory gearbox heat load $Q_{GB}$ is based on the maximum continuous thrust $T_{Max.\ Cont.}$ and the maximum continuous cruise speed $V_{Cruise}$ associated with the turbofan engine 100, the accessory gearbox heat load $Q_{GB}$ can be deemed a maximum continuous heat load, or rather, a maximum heat load the accessory gearbox 145 can generate continuously. It should be noted that the maximum continuous heat load is different than the absolute maximum heat load the accessory gearbox 145 can generate, e.g., during takeoff.

In some embodiments, the accessory gearbox efficiency $\eta_{GB}$ of the accessory gearbox 145 is between 99.2 and 99.8. For instance, in some embodiments, the accessory gearbox efficiency $\eta_{GB}$ of the accessory gearbox 145 can be 99.5. The unit of measure for the maximum continuous thrust $T_{Max.\ Cont.}$ is kilonewtons (kN). The unit of measure for the maximum cruise speed $V_{Cruise}$ is meters per second (m/s). The accessory gearbox efficiency 17 GB is a dimensionless quantity. The accessory gearbox heat load $Q_{GB}$ is defined by the inventor as follows:

$$Q_{GB} = T_{Max.\ Cont.} * (1 - \eta_{GB}) * V_{Cruise} \qquad (5)$$

The hydraulic pump power $P_{H-Pump}$ of the hydraulic pump 149 associated with the first quotient of (4) is defined as a product determined by multiplying a hydraulic pump continuous torque $\tau_{H-Pump}$ associated with the hydraulic pump 149 by a speed ratio $n_{speed\ Ratio}$ of the hydraulic pump 149 by two (2) times Pi ($2\pi$) by a rotational speed N2 of the high pressure spool, or HP spool 131, at one hundred percent capacity (100%). The unit of measure for the hydraulic pump power $P_{H-Pump}$ is kilowatts (kW). The unit of measure for the hydraulic pump continuous torque $\tau_{H-Pump}$ is kilonewtons (kN). The speed ratio $n_{speed\ Ratio}$ is a dimensionless quantity. The unit of measure for the rotational speed N2 of the high pressure spool 131 is revolutions per minute (RPM) at one hundred percent (100%) capacity. The hydraulic pump power $P_{H-Pump}$ is defined by the inventor as follows:

$$P_{H-Pump} = \tau_{H-Pump} * n_{Speed\ Ratio} * 2\pi * N2 \qquad (6)$$

The fan diameter $D_{FAN}$ associated with the second quotient of (4) is defined as a distance spanning between a leading edge tip of one fan blade 136 to a leading edge tip of a radially opposite fan blade 136. Stated another way, the fan diameter $D_{FAN}$ is defined as a fan radius $R_{FAN}$ multiplied by two, or stated mathematically, as $D_{FAN} = R_{FAN} * 2$, wherein the fan radius $R_{FAN}$ spans from the longitudinal centerline 102 to a leading edge tip of one of the fan blades 136. The unit of measure for the fan diameter $D_{FAN}$ is meters (m). In some example embodiments, the fan diameter $D_{FAN}$ of the fan 134 of the turbofan engine 100 is between 0.7 m and 3.5 m. In other example embodiments, the fan diameter $D_{FAN}$ of the fan 134 of the turbofan engine 100 is between 1.8 m and 3.5 m. In instances in which the fan section 104 includes a plurality of fan stages, the fan diameter $D_{FAN}$ is to be determined based on the fan having the largest fan diameter.

The bypass ratio BPR associated with the second quotient of (4) is defined by the inventor as a ratio of a mass flow rate of the first portion of air 158 flowing through the bypass passage 152 to a mass flow rate of the second portion of air 160 entering the engine core 106 through the core inlet 110. In some example embodiments, the bypass ratio BPR of the turbofan engine 100 may be between three and twenty (3-20). In other example embodiments, the bypass ratio BPR of the turbofan engine 100 may be between three and ten (3-10). In further example embodiments, the bypass ratio BPR of the turbofan engine 100 may be between ten and twenty (10-20).

Figure 6:
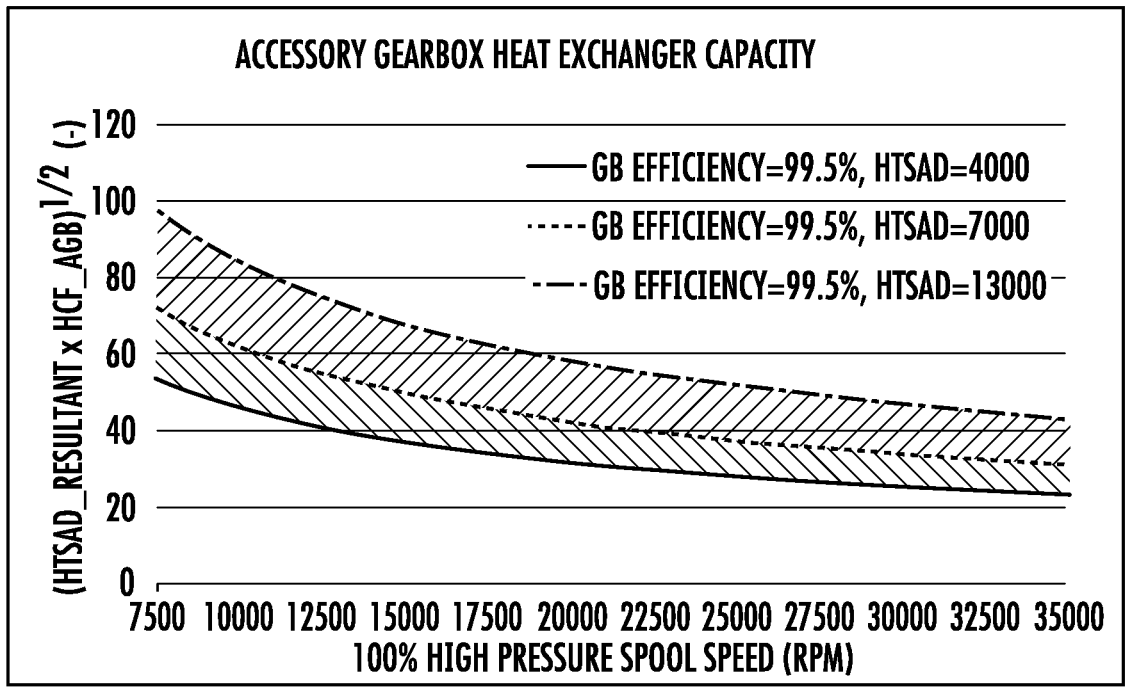
FIGS. 6 through 12 each graphically depict a heat exchanger capacity of one or more heat exchangers tied to an accessory gearbox of a turbofan engine as a function of a rotational speed of a high pressure spool of the turbofan engine in accordance with example embodiments of the present disclosure.

In some embodiments, the heat exchanger capacity HEC is between 23.9 and 97.7 for a rotational speed N2 of the high pressure spool 131 between 7,500 and 35,000 revolutions per minute (RPM) at one hundred percent (100%) capacity and a resultant heat transfer surface area density $HTSAD_R$ being between 4,000 $m^2/m^3$ and 13,000 $m^2/m^3$. FIG. 6 graphically depicts the heat exchanger capacity HEC as a function of the rotational speed N2 of the high pressure spool 131 for such example embodiments.

Figure 7:
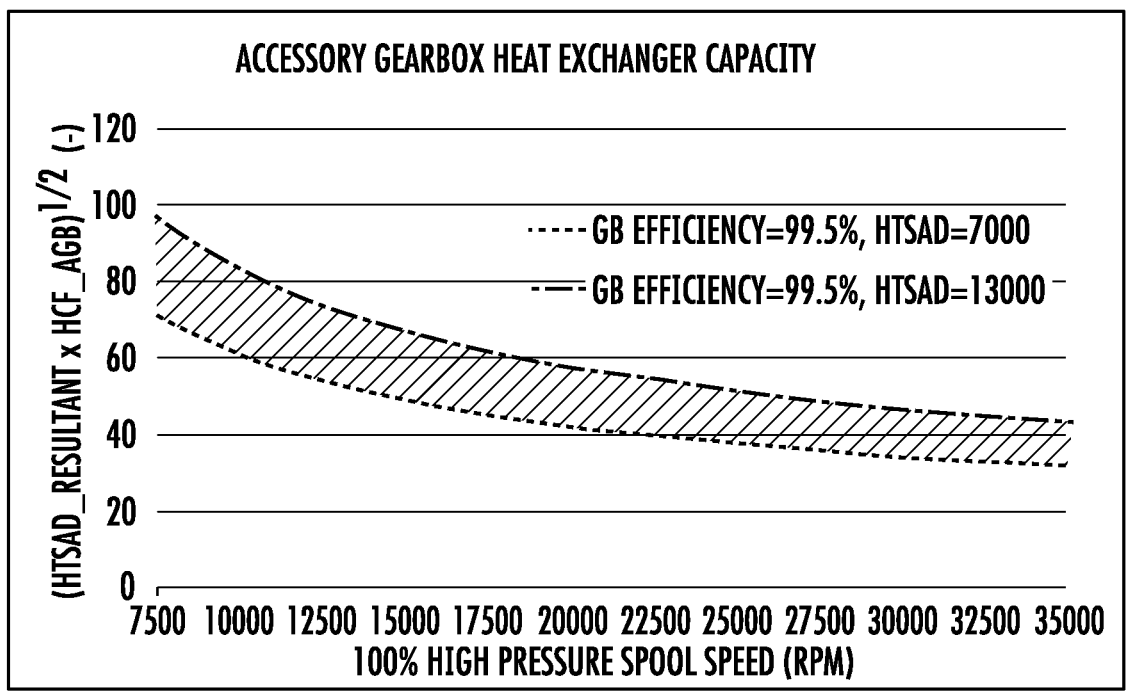

In yet other embodiments, the heat exchanger capacity HEC is between 31.5 and 97.7 for a rotational speed N2 of the high pressure spool 131 between 7,500 and 35,000 revolutions per minute (RPM) at one hundred percent (100%) capacity and a resultant heat transfer surface area density $HTSAD_R$ being between 7,000 $m^2/m^3$ and 13,000 $m^2/m^3$. FIG. 7 graphically depicts the heat exchanger capacity HEC as a function of the rotational speed N2 of the high pressure spool 131 for such example embodiments.

Figure 8:
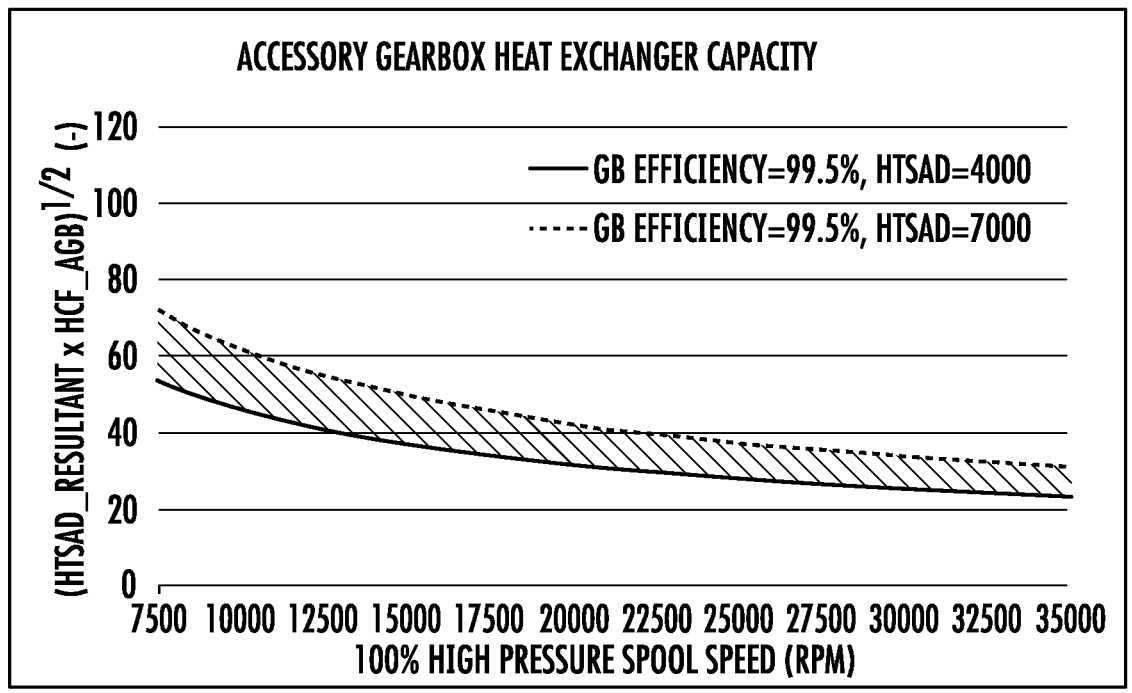

In some further embodiments, the heat exchanger capacity HEC is between 23.9 and 71.7 for a rotational speed N2 of the high pressure spool 131 between 7,500 and 35,000 revolutions per minute (RPM) at one hundred percent (100%) capacity and a resultant heat transfer surface area density $HTSAD_R$ being between 4,000 $m^2/m^3$ and 7,000 $m^2/m^3$. FIG. 8 graphically depicts the heat exchanger capacity HEC as a function of the rotational speed N2 of the high pressure spool 131 for such example embodiments.

Figure 9:
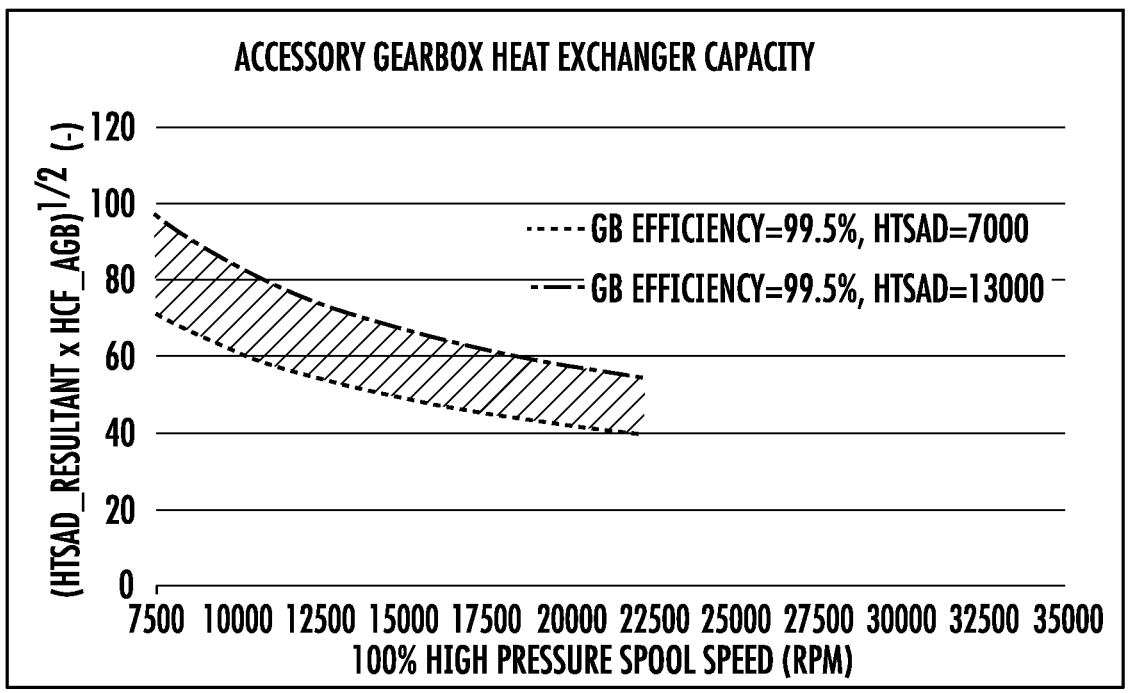

In yet other embodiments, the heat exchanger capacity HEC is between 40.0 and 97.7 for a rotational speed N2 of the high pressure spool 131 between 7,500 and 22,500 revolutions per minute (RPM) at one hundred percent (100%) capacity and a resultant heat transfer surface area density $HTSAD_R$ being between 7,000 $m^2/m^3$ and 13,000 $m^2/m^3$. FIG. 9 graphically depicts the heat exchanger capacity HEC as a function of the rotational speed N2 of the high pressure spool 131 for such example embodiments.

Figure 10:
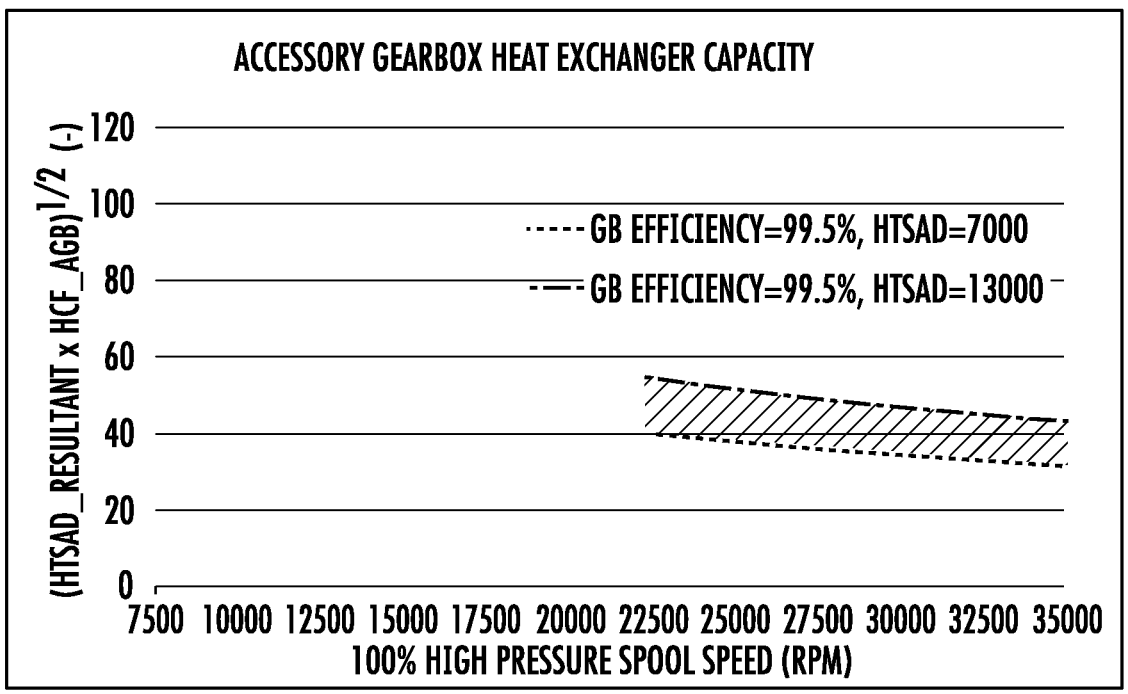

In further embodiments, the heat exchanger capacity HEC is between 31.5 and 54.5 for a rotational speed N2 of the high pressure spool 131 between 22,500 and 35,000 revolutions per minute (RPM) at one hundred percent (100%) capacity and a resultant heat transfer surface area density HTSAD$_R$ being between 7,000 m$^2$/m$^3$ and 13,000 m$^2$/m$^3$. FIG. 10 graphically depicts the heat exchanger capacity HEC as a function of the rotational speed N2 of the high pressure spool 131 for such example embodiments.

Figure 11:
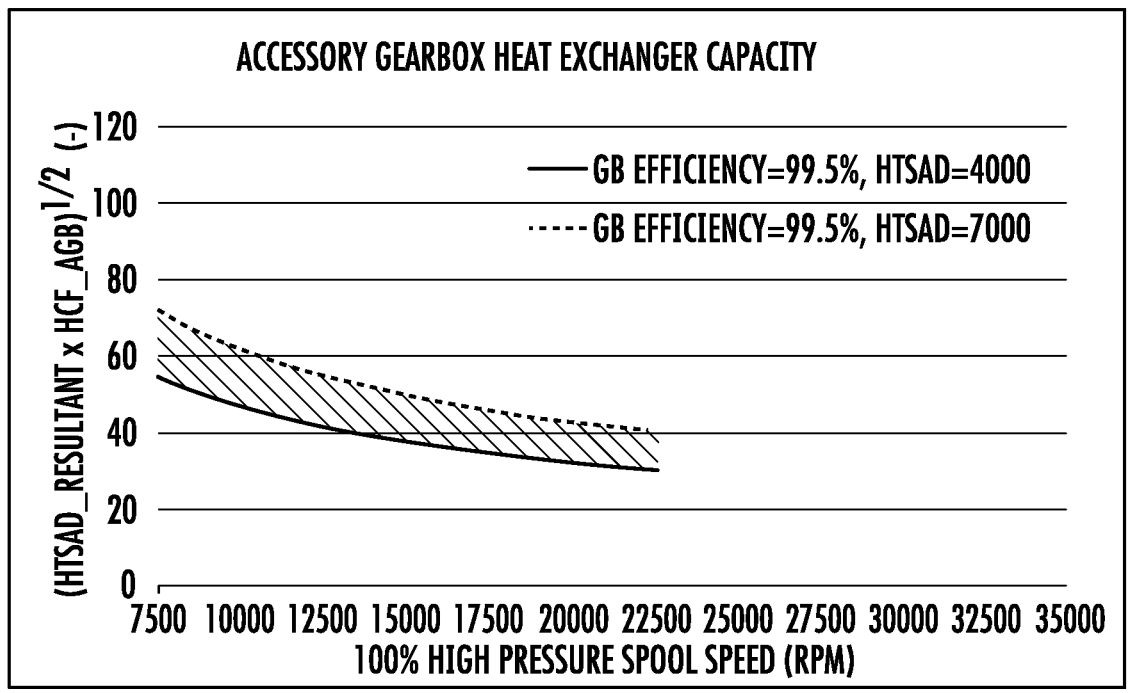

In some further embodiments, the heat exchanger capacity HEC is between 30.2 and 71.7 for a rotational speed N2 of the high pressure spool 131 between 7,500 and 22,500 revolutions per minute (RPM) at one hundred percent (100%) capacity and a resultant heat transfer surface area density HTSAD$_R$ being between 4,000 m$^2$/m$^3$ and 7,000 m$^2$/m$^3$. FIG. 11 graphically depicts the heat exchanger capacity HEC as a function of the rotational speed N2 of the high pressure spool 131 for such example embodiments.

Figures 12, 13:
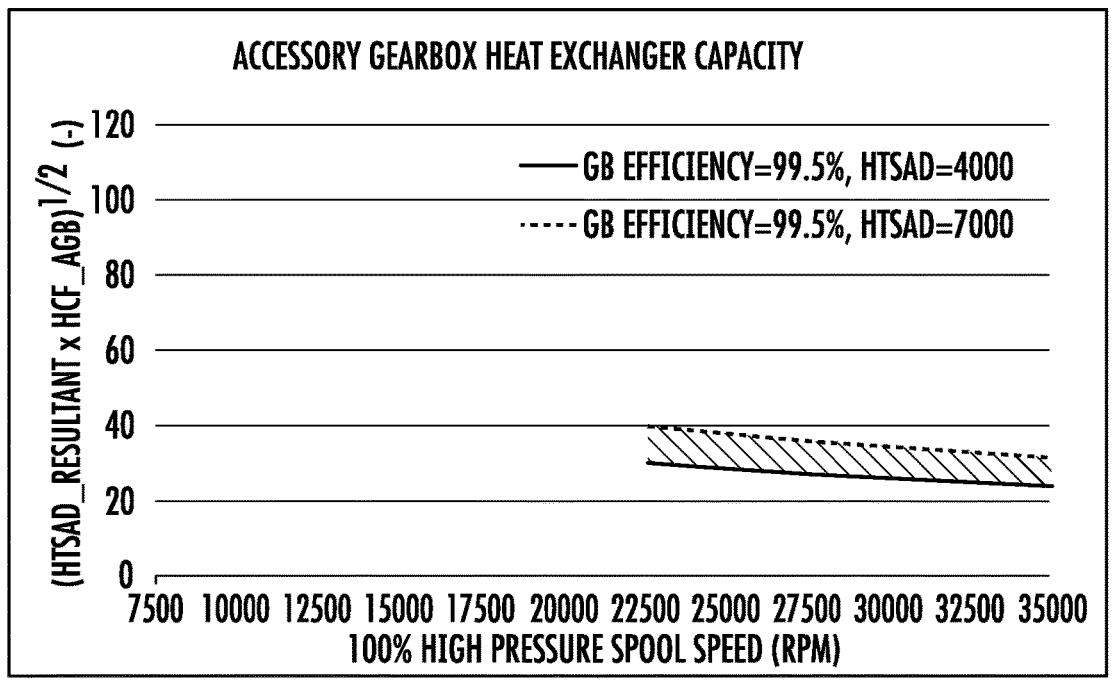
FIG. 13 provides a table listing values for different example turbofan engines in accordance with example embodiments of the present disclosure.

In yet other embodiments, the heat exchanger capacity HEC is between 23.9 and 40 for a rotational speed N2 of the high pressure spool 131 between 22,500 and 35,000 revolutions per minute (RPM) at one hundred percent (100%) capacity and a resultant heat transfer surface area density HTSAD$_R$ being between 4,000 m$^2$/m$^3$ and 7,000 m$^2$/m$^3$. FIG. 12 graphically depicts the heat exchanger capacity HEC as a function of the rotational speed N2 of the high pressure spool 131 for such example embodiments.

With reference to FIG. 13, various example turbofan engines each having one or more heat exchangers tied to an accessory gearbox are provided below.

Example 1: In a first example, a turbofan engine includes one or more heat exchangers tied to an accessory gearbox. The accessory gearbox is mechanically coupled with a high pressure spool of the turbofan engine. One or more engine accessories are mechanically coupled with the accessory gearbox. For instance, a hydraulic pump can be mechanically coupled with the accessory gearbox. The one or more heat exchangers are arranged such that the resultant heat transfer surface area density HTSAD$_R$ is 4,000 m$^2$/m$^3$. The fan has a fan diameter D$_{FAN}$ of 0.7 m. The turbofan engine defines a bypass ratio BPR of 3. The turbofan engine is further arranged so that a maximum continuous thrust of the turbofan engine is 35 kN, a maximum cruise speed of the turbofan engine is 243.33 m/s, and a rotational speed of the high pressure spool of the turbofan engine is 7,500 RPM at one hundred percent capacity (100%). The accessory gearbox of the turbofan engine is arranged so that the accessory gearbox has a gearbox efficiency of 99.8%. The hydraulic pump is arranged so as to have a hydraulic pump speed ratio of 0.7 and a hydraulic pump continuous torque of 50 Nm. Thus, the heat conductance factor is 0.144583 m. Accordingly, for the first example, the heat exchanger capacity HEC is 24.05.

Example 2: In a second example, a turbofan engine includes one or more heat exchangers tied to an accessory gearbox. The accessory gearbox is mechanically coupled with a high pressure spool of the turbofan engine. One or more engine accessories are mechanically coupled with the accessory gearbox. For instance, a hydraulic pump can be mechanically coupled with the accessory gearbox. The one or more heat exchangers are arranged such that the resultant heat transfer surface area density HTSAD$_R$ is 7,000 m$^2$/m$^3$. The fan has a fan diameter D$_{FAN}$ of 1.5 m. The turbofan engine defines a bypass ratio BPR of 10. The turbofan engine is further arranged so that a maximum continuous thrust of the turbofan engine is 100 kN, a maximum cruise speed of the turbofan engine is 243.33 m/s, and a rotational speed of the high pressure spool of the turbofan engine is 12,000 RPM at one hundred percent capacity (100%). The accessory gearbox of the turbofan engine is arranged so that the accessory gearbox has a gearbox efficiency of 99.7%. The hydraulic pump is arranged so as to have a hydraulic pump speed ratio of 0.5 and a hydraulic pump continuous torque of 110 Nm. Thus, the heat conductance factor is 0.158432 m. Accordingly, for the second example, the heat exchanger capacity HEC is 33.30.

Example 3: In a third example, a turbofan engine includes one or more heat exchangers tied to an accessory gearbox. The accessory gearbox is mechanically coupled with a high pressure spool of the turbofan engine. One or more engine accessories are mechanically coupled with the accessory gearbox. For instance, a hydraulic pump can be mechanically coupled with the accessory gearbox. The one or more heat exchangers are arranged such that the resultant heat transfer surface area density HTSAD$_R$ is 10,000 m$^2$/m$^3$. The fan has a fan diameter D$_{FAN}$ of 1.9 m. The turbofan engine defines a bypass ratio BPR of 15. The turbofan engine is further arranged so that a maximum continuous thrust of the turbofan engine is 250 kN, a maximum cruise speed of the turbofan engine is 243.33 m/s, and a rotational speed of the high pressure spool of the turbofan engine is 24,000 RPM at one hundred percent capacity (100%). The accessory gearbox of the turbofan engine is arranged so that the accessory gearbox has a gearbox efficiency of 99.6%. The hydraulic pump is arranged so as to have a hydraulic pump speed ratio of 0.3 and a hydraulic pump continuous torque of 146.9 Nm. Thus, the heat conductance factor is 0.278279 m. Accordingly, for the third example, the heat exchanger capacity HEC is 52.75.

Example 4: In a fourth example, a turbofan engine includes one or more heat exchangers tied to an accessory gearbox. The accessory gearbox is mechanically coupled with a high pressure spool of the turbofan engine. One or more engine accessories are mechanically coupled with the accessory gearbox. For instance, a hydraulic pump can be mechanically coupled with the accessory gearbox. The one or more heat exchangers are arranged such that the resultant heat transfer surface area density HTSAD$_R$ is 13,000 m$^2$/m$^3$. The fan has a fan diameter D$_{FAN}$ of 3.5 m. The turbofan engine defines a bypass ratio BPR of 20. The turbofan engine is further arranged so that a maximum continuous thrust of the turbofan engine is 400 kN, a maximum cruise speed of the turbofan engine is 243.33 m/s, and a rotational speed of the high pressure spool of the turbofan engine is 35,000 RPM at one hundred percent capacity (100%). The accessory gearbox of the turbofan engine is arranged so that the accessory gearbox has a gearbox efficiency of 99.5%. The hydraulic pump is arranged so as to have a hydraulic pump speed ratio of 0.17 and a hydraulic pump continuous torque of 196.17 Nm. Thus, the heat conductance factor is 0.696773 m. Accordingly, for the fourth example, the heat exchanger capacity HEC is 95.17.

FIG. 14 provides a flow diagram for a method 300 of operating a turbofan engine having one or more heat exchangers tied to an accessory gearbox of the turbofan engine. The turbofan engine can be mounted to an aircraft, for example.

At 302, the method 300 includes operating a turbofan engine having a low pressure spool, a fan mechanically coupled with the low pressure spool, a high pressure spool, an accessory gearbox mechanically coupled with the high pressure spool, a hydraulic pump mechanically coupled with the accessory gearbox, and one or more heat exchangers tied to the accessory gearbox, the one or more heat exchangers having a heat exchanger capacity defined by a product raised to a half power, the product being determined by multiplying a resultant heat transfer surface area density associated with the one or more heat exchangers by a heat conductance factor that relates an accessory gearbox heat load associated with the accessory gearbox, a hydraulic pump power of the hydraulic pump, a fan diameter of the fan, and a bypass ratio of the turbofan engine, and wherein the heat exchanger capacity is between 23.9 and 97.7 for a rotational speed of the high pressure spool between 7,500 and 35,000 revolutions per minute at one hundred percent (100%) capacity and a resultant heat transfer surface area density being between 4,000 $m^2/m^3$ and 13,000 $m^2/m^3$. The heat exchanger capacity according to such implementations is graphically represented in FIG. 6.

In some implementations, the heat exchanger capacity is between 31.5 and 97.7 for the rotational speed of the high pressure spool between 7,500 and 35,000 revolutions per minute at one hundred percent (100%) capacity and the resultant heat transfer surface area density being between 7,000 $m^2/m^3$ and 13,000 $m^2/m^3$. The heat exchanger capacity according to such implementations is graphically represented in FIG. 7.

In some other implementations, the heat exchanger capacity is between 23.9 and 71.7 for the rotational speed of the high pressure spool between 7,500 and 35,000 revolutions per minute at one hundred percent (100%) capacity and the resultant heat transfer surface area density being between 4,000 $m^2/m^3$ and 7,000 $m^2/m^3$. The heat exchanger capacity according to such implementations is graphically represented in FIG. 8.

In yet other implementations, the heat exchanger capacity is between 40.0 and 97.7 for a rotational speed of the high pressure spool between 7,500 and 22,500 revolutions per minute at one hundred percent (100%) capacity and a resultant heat transfer surface area density being between 7,000 $m^2/m^3$ and 13,000 $m^2/m^3$. The heat exchanger capacity according to such implementations is graphically represented in FIG. 9.

In further implementations, the heat exchanger capacity is between 31.5 and 54.5 for a rotational speed of the high pressure spool between 22,500 and 35,000 revolutions per minute at one hundred percent (100%) capacity and a resultant heat transfer surface area density being between 7,000 $m^2/m^3$ and 13,000 $m^2/m^3$. The heat exchanger capacity according to such implementations is graphically represented in FIG. 10.

In some further implementations, the heat exchanger capacity is between 30.2 and 71.7 for a rotational speed of the high pressure spool between 7,500 and 22,500 revolutions per minute at one hundred percent (100%) capacity and a resultant heat transfer surface area density being between 4,000 $m^2/m^3$ and 7,000 $m^2/m^3$. The heat exchanger capacity according to such implementations is graphically represented in FIG. 11.

In yet other implementations, the heat exchanger capacity is between 23.9 and 40 for a rotational speed of the high pressure spool 131 between 22,500 and 35,000 revolutions per minute at one hundred percent (100%) capacity and a resultant heat transfer surface area density being between 4,000 $m^2/m^3$ and 7,000 $m^2/m^3$. The heat exchanger capacity according to such implementations is graphically represented in FIG. 12.

In some implementations, the resultant heat transfer surface area density is determined by taking a product to an Nth root, wherein the product is determined by multiplying together a heat transfer surface area density associated with each of the one or more heat exchangers tied to the accessory gearbox, wherein N is a number of heat exchangers tied to the accessory gearbox. The heat transfer surface area density for a given one of the one or more heat exchangers is defined as a quotient determined by dividing a heat exchanger channel surface area associated with a plurality of channels of the given one of the one or more heat exchangers to a heat exchanger channel volume associated with the plurality of channels of the given one of the one or more heat exchangers.

Further, in some implementations, the heat conductance factor is defined as a product determined by multiplying a first quotient by a second quotient, the first quotient being determined by dividing the accessory gearbox heat load by the hydraulic pump power of the hydraulic pump at one hundred percent capacity, the second quotient being determined by dividing the fan diameter of the fan by the bypass ratio of the turbofan engine.

In some implementations, the accessory gearbox heat load is defined as a product determined by multiplying a maximum continuous thrust associated with the turbofan engine by one minus an accessory gearbox efficiency of the accessory gearbox and by a maximum cruise speed associated with the turbofan engine.

In some implementations, the hydraulic pump power of the hydraulic pump is defined as a product determined by multiplying a hydraulic pump continuous torque associated with the hydraulic pump by a speed ratio of the hydraulic pump by two times Pi ($2\pi$) by a rotational speed of the high pressure spool at one hundred percent (100%) capacity.

The fan diameter of the fan is defined as a distance spanning between a leading edge tip of one fan blade of the fan to a leading edge tip of a radially opposite fan blade. Stated another way, the fan diameter is defined as a fan radius multiplied by two, wherein the fan radius spans from the longitudinal centerline of the turbofan engine to a leading edge tip of one of the fan blades. The bypass ratio of a turbofan engine is defined by a ratio of a mass flow rate of a first portion of air flowing through a bypass passage to a mass flow rate of a second portion of air entering the engine core through the core inlet.

In some implementations, the one or more heat exchangers tied to the accessory gearbox include a fuel-to-oil heat exchanger, an air-to-oil heat exchanger, and an oil-to-oil heat exchanger. In some implementations, the one or more heat exchangers tied to the accessory gearbox include at least one of each of a fuel-to-oil heat exchanger, an air-to-oil heat exchanger, and an oil-to-oil heat exchanger, and at least two of one of the fuel-to-oil heat exchanger, the air-to-oil heat exchanger, and the oil-to-oil heat exchanger.

In some implementations, the one or more heat exchangers include at least four (4) heat exchangers. In some implementations, the one or more heat exchangers include at least three (3) heat exchangers. In some implementations, the one or more heat exchangers include at least two (2) heat exchangers. In some implementations, the one or more heat exchangers include one (1) heat exchanger. In some implementations, the one or more heat exchangers include between four (4) and ten (10) heat exchangers.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbofan engine, comprising: a low pressure spool; a fan mechanically coupled with the low pressure spool; a high pressure spool; an accessory gearbox mechanically coupled with the high pressure spool; a hydraulic pump mechanically coupled with the accessory gearbox; and one or more heat exchangers tied to the accessory gearbox, the one or more heat exchangers having a heat exchanger capacity defined by a product raised to a half power, the product being determined by multiplying a resultant heat transfer surface area density associated with the one or more heat exchangers by a heat conductance factor that relates an accessory gearbox heat load, a hydraulic pump power of the hydraulic pump, a fan diameter of the fan, and a bypass ratio of the turbofan engine, and wherein the heat exchanger capacity is between 23.9 and 97.7 for a rotational speed of the high pressure spool between 7,500 and 35,000 revolutions per minute at one hundred percent capacity and a resultant heat transfer surface area density being between 4,000 $m^2/m^3$ and 13,000 $m^2/m^3$.

The turbofan engine of any preceding clause, wherein the resultant heat transfer surface area density is determined by taking a product to an Nth root, wherein the product is determined by multiplying together a heat transfer surface area density associated with each of the one or more heat exchangers tied to the accessory gearbox, wherein N is a number of heat exchangers tied to the accessory gearbox.

The turbofan engine of any preceding clause, wherein the one or more heat exchangers each have one or more exchanger units each having a core defining a plurality of channels.

The turbofan engine of any preceding clause, wherein the heat transfer surface area density for a given one of the one or more heat exchangers is defined as a quotient determined by dividing a heat exchanger channel surface area associated with the plurality of channels of the given one of the one or more heat exchangers to a heat exchanger channel volume associated with the plurality of channels of the given one of the one or more heat exchangers.

The turbofan engine of any preceding clause, wherein the heat conductance factor is defined as a product determined by multiplying a first quotient by a second quotient, the first quotient being determined by dividing the accessory gearbox heat load by the hydraulic pump power of the hydraulic pump at one hundred percent capacity, the second quotient being determined by dividing the fan diameter by the bypass ratio.

The turbofan engine of any preceding clause, wherein the accessory gearbox heat load is defined as a product determined by multiplying a maximum continuous thrust associated with the turbofan engine by one minus an accessory gearbox efficiency of the accessory gearbox and by a maximum cruise speed associated with the turbofan engine.

The turbofan engine of any preceding clause, wherein the accessory gearbox efficiency is between 99.2 and 99.8.

The turbofan engine of any preceding clause, wherein the hydraulic pump power of the hydraulic pump is defined as a product determined by multiplying a hydraulic pump continuous torque associated with the hydraulic pump by a speed ratio of the hydraulic pump by two times Pi by a rotational speed of the high pressure spool at one hundred percent capacity.

The turbofan engine of any preceding clause, wherein the heat exchanger capacity is between 31.5 and 97.7 for the rotational speed of the high pressure spool between 7,500 and 35,000 revolutions per minute at one hundred percent capacity and the resultant heat transfer surface area density being between 7,000 $m^2/m^3$ and 13,000 $m^2/m^3$.

The turbofan engine of any preceding clause, wherein the heat exchanger capacity is between 23.9 and 71.7 for the rotational speed of the high pressure spool between 7,500 and 35,000 revolutions per minute at one hundred percent capacity and the resultant heat transfer surface area density being between 4,000 $m^2/m^3$ and 7,000 $m^2/m^3$.

The turbofan engine of any preceding clause, wherein the heat exchanger capacity is between 40.0 and 97.7 for the rotational speed of the high pressure spool between 7,500 and 22,500 revolutions per minute at one hundred percent capacity and the resultant heat transfer surface area density being between 7,000 $m^2/m^3$ and 13,000 $m^2/m^3$.

The turbofan engine of any preceding clause, wherein the heat exchanger capacity is between 31.5 and 54.5 for the rotational speed of the high pressure spool between 22,500 and 35,000 revolutions per minute at one hundred percent capacity and the resultant heat transfer surface area density being between 7,000 $m^2/m^3$ and 13,000 $m^2/m^3$.

The turbofan engine of any preceding clause, wherein the heat exchanger capacity is between 30.2 and 71.7 for the rotational speed of the high pressure spool between 7,500 and 22,500 revolutions per minute at one hundred percent capacity and the resultant heat transfer surface area density being between 4,000 $m^2/m^3$ and 7,000 $m^2/m^3$.

The turbofan engine of any preceding clause, wherein the heat exchanger capacity is between 23.9 and 40 for the rotational speed of the high pressure spool between 22,500 and 35,000 revolutions per minute at one hundred percent capacity and the resultant heat transfer surface area density being between 4,000 $m^2/m^3$ and 7,000 $m^2/m^3$.

The turbofan engine of any preceding clause, wherein the one or more heat exchangers include a fuel-to-oil heat exchanger, an air-to-oil heat exchanger, and an oil-to-oil heat exchanger.

The turbofan engine of any preceding clause, wherein the one or more heat exchangers include at least four heat exchangers.

A method, comprising: operating a turbofan engine having a low pressure spool, a fan mechanically coupled with the low pressure spool, a high pressure spool, an accessory gearbox mechanically coupled with the high pressure spool, a hydraulic pump mechanically coupled with the accessory gearbox, and one or more heat exchangers tied to the accessory gearbox, the one or more heat exchangers having a heat exchanger capacity defined by a product raised to a half power, the product being determined by multiplying a resultant heat transfer surface area density associated with the one or more heat exchangers by a heat conductance factor that relates an accessory gearbox heat load associated with the accessory gearbox, a hydraulic pump power of the hydraulic pump, a fan diameter of the fan, and a bypass ratio of the turbofan engine, and wherein the heat exchanger capacity is between 23.9 and 97.7 for a rotational speed of the high pressure spool between 7,500 and 35,000 revolutions per minute at one hundred percent capacity and a resultant heat transfer surface area density being between 4,000 $m^2/m^3$ and 13,000 $m^2/m^3$.

The method of any preceding clause, wherein the heat exchanger capacity is between 31.5 and 97.7 for the rotational speed of the high pressure spool between 7,500 and 35,000 revolutions per minute at one hundred percent capacity and the resultant heat transfer surface area density being between 7,000 m$^2$/m$^3$ and 13,000 m$^2$/m$^3$.

The method of any preceding clause, wherein the heat exchanger capacity is between 23.9 and 71.7 for the rotational speed of the high pressure spool between 7,500 and 35,000 revolutions per minute at one hundred percent capacity and the resultant heat transfer surface area density being between 4,000 m$^2$/m$^3$ and 7,000 m$^2$/m$^3$.

A cooling system for a turbofan engine, comprising: one or more heat exchangers tied to an accessory gearbox mechanically coupling with a high pressure spool of the turbofan engine, the one or more heat exchangers have a heat exchanger capacity defined by a product raised to a half power, the product being determined by multiplying a resultant heat transfer surface area density associated with the one or more heat exchangers by a heat conductance factor that relates an accessory gearbox heat load, a hydraulic pump power of a hydraulic pump mechanically coupled with the accessory gearbox, a fan diameter of a fan of the turbofan engine, and a bypass ratio of the turbofan engine, and wherein the heat exchanger capacity is between 23.9 and 97.7 for a rotational speed of the high pressure spool between 7,500 and 35,000 revolutions per minute and a resultant heat transfer surface area density being between 4,000 m$^2$/m$^3$ and 13,000 m$^2$/m$^3$.

We claim:

1. A turbofan engine, comprising:
   a low pressure spool;
   a fan mechanically coupled with the low pressure spool;
   a high pressure spool;
   an accessory gearbox mechanically coupled with the high pressure spool;
   a hydraulic pump mechanically coupled with the accessory gearbox; and
   one or more heat exchangers tied to the accessory gearbox, the one or more heat exchangers having a heat exchanger capacity defined by a product raised to a half power, the product being determined by multiplying a resultant heat transfer surface area density associated with the one or more heat exchangers by a heat conductance factor that relates an accessory gearbox heat load, a hydraulic pump power of the hydraulic pump, a fan diameter of the fan, and a bypass ratio of the turbofan engine, and
   wherein the heat exchanger capacity is between 23.9 and 97.7 for a rotational speed of the high pressure spool between 7,500 and 35,000 revolutions per minute at one hundred percent capacity and a resultant heat transfer surface area density being between 4,000 m$^2$/m$^3$ and 13,000 m$^2$/m$^3$.

2. The turbofan engine of claim 1, wherein the resultant heat transfer surface area density is determined by taking a product to an Nth root, wherein the product is determined by multiplying together a heat transfer surface area density associated with each of the one or more heat exchangers tied to the accessory gearbox, wherein N is a number of heat exchangers tied to the accessory gearbox.

3. The turbofan engine of claim 2, wherein the one or more heat exchangers each have one or more exchanger units each having a core defining a plurality of channels.

4. The turbofan engine of claim 3, wherein the heat transfer surface area density for a given one of the one or more heat exchangers is defined as a quotient determined by dividing a heat exchanger channel surface area associated with the plurality of channels of the given one of the one or more heat exchangers to a heat exchanger channel volume associated with the plurality of channels of the given one of the one or more heat exchangers.

5. The turbofan engine of claim 1, wherein the heat conductance factor is defined as a product determined by multiplying a first quotient by a second quotient, the first quotient being determined by dividing the accessory gearbox heat load by the hydraulic pump power of the hydraulic pump at one hundred percent capacity, the second quotient being determined by dividing the fan diameter by the bypass ratio.

6. The turbofan engine of claim 5, wherein the accessory gearbox heat load is defined as a product determined by multiplying a maximum continuous thrust associated with the turbofan engine by one minus an accessory gearbox efficiency of the accessory gearbox and by a maximum cruise speed associated with the turbofan engine.

7. The turbofan engine of claim 6, wherein the accessory gearbox efficiency is between 99.2 and 99.8.

8. The turbofan engine of claim 5, wherein the hydraulic pump power of the hydraulic pump is defined as a product determined by multiplying a hydraulic pump continuous torque associated with the hydraulic pump by a speed ratio of the hydraulic pump by two times Pi by a rotational speed of the high pressure spool at one hundred percent capacity.

9. The turbofan engine of claim 1, wherein the heat exchanger capacity is between 31.5 and 97.7 for the rotational speed of the high pressure spool between 7,500 and 35,000 revolutions per minute at one hundred percent capacity and the resultant heat transfer surface area density being between 7,000 m$^2$/m$^3$ and 13,000 m$^2$/m$^3$.

10. The turbofan engine of claim 1, wherein the heat exchanger capacity is between 23.9 and 71.7 for the rotational speed of the high pressure spool between 7,500 and 35,000 revolutions per minute at one hundred percent capacity and the resultant heat transfer surface area density being between 4,000 m$^2$/m$^3$ and 7,000 m$^2$/m$^3$.

11. The turbofan engine of claim 1, wherein the heat exchanger capacity is between 40.0 and 97.7 for the rotational speed of the high pressure spool between 7,500 and 22,500 revolutions per minute at one hundred percent capacity and the resultant heat transfer surface area density being between 7,000 m$^2$/m$^3$ and 13,000 m$^2$/m$^3$.

12. The turbofan engine of claim 1, wherein the heat exchanger capacity is between 31.5 and 54.5 for the rotational speed of the high pressure spool between 22,500 and 35,000 revolutions per minute at one hundred percent capacity and the resultant heat transfer surface area density being between 7,000 m$^2$/m$^3$ and 13,000 m$^2$/m$^3$.

13. The turbofan engine of claim 1, wherein the heat exchanger capacity is between 30.2 and 71.7 for the rotational speed of the high pressure spool between 7,500 and 22,500 revolutions per minute at one hundred percent capacity and the resultant heat transfer surface area density being between 4,000 m$^2$/m$^3$ and 7,000 m$^2$/m$^3$.

14. The turbofan engine of claim 1, wherein the heat exchanger capacity is between 23.9 and 40 for the rotational speed of the high pressure spool between 22,500 and 35,000 revolutions per minute at one hundred percent capacity and the resultant heat transfer surface area density being between 4,000 m$^2$/m$^3$ and 7,000 m$^2$/m$^3$.

15. The turbofan engine of claim 1, wherein the one or more heat exchangers include a fuel-to-oil heat exchanger, an air-to-oil heat exchanger, and an oil-to-oil heat exchanger.

16. The turbofan engine of claim 1, wherein the one or more heat exchangers include at least four heat exchangers.

17. A method, comprising:
operating a turbofan engine having a low pressure spool, a fan mechanically coupled with the low pressure spool, a high pressure spool, an accessory gearbox mechanically coupled with the high pressure spool, a hydraulic pump mechanically coupled with the accessory gearbox, and one or more heat exchangers tied to the accessory gearbox, the one or more heat exchangers having a heat exchanger capacity defined by a product raised to a half power, the product being determined by multiplying a resultant heat transfer surface area density associated with the one or more heat exchangers by a heat conductance factor that relates an accessory gearbox heat load associated with the accessory gearbox, a hydraulic pump power of the hydraulic pump, a fan diameter of the fan, and a bypass ratio of the turbofan engine, and
wherein the heat exchanger capacity is between 23.9 and 97.7 for a rotational speed of the high pressure spool between 7,500 and 35,000 revolutions per minute at one hundred percent capacity and a resultant heat transfer surface area density being between 4,000 $m^2/m^3$ and 13,000 $m^2/m^3$.

18. The method of claim 17, wherein the heat exchanger capacity is between 31.5 and 97.7 for the rotational speed of the high pressure spool between 7,500 and 35,000 revolutions per minute at one hundred percent capacity and the resultant heat transfer surface area density being between 7,000 $m^2/m^3$ and 13,000 $m^2/m^3$.

19. The method of claim 17, wherein the heat exchanger capacity is between 23.9 and 71.7 for the rotational speed of the high pressure spool between 7,500 and 35,000 revolutions per minute at one hundred percent capacity and the resultant heat transfer surface area density being between 4,000 $m^2/m^3$ and 7,000 $m^2/m^3$.

20. A cooling system for a turbofan engine, comprising:
one or more heat exchangers tied to an accessory gearbox mechanically coupling with a high pressure spool of the turbofan engine, the one or more heat exchangers have a heat exchanger capacity defined by a product raised to a half power, the product being determined by multiplying a resultant heat transfer surface area density associated with the one or more heat exchangers by a heat conductance factor that relates an accessory gearbox heat load, a hydraulic pump power of a hydraulic pump mechanically coupled with the accessory gearbox, a fan diameter of a fan of the turbofan engine, and a bypass ratio of the turbofan engine, and
wherein the heat exchanger capacity is between 23.9 and 97.7 for a rotational speed of the high pressure spool between 7,500 and 35,000 revolutions per minute and a resultant heat transfer surface area density being between 4,000 $m^2/m^3$ and 13,000 $m^2/m^3$.

\* \* \* \* \*